United States Patent
Yu et al.

(10) Patent No.: US 9,285,621 B2
(45) Date of Patent: Mar. 15, 2016

(54) LIQUID CRYSTAL DISPLAY AND MANUFACTURING METHOD THEREOF

(71) Applicant: Samsung Display Co., Ltd., Yongin (KR)

(72) Inventors: Dong Hyun Yu, Gwacheon-si (KR); Hyung-Il Jeon, Incheon-si (KR); Gwan Ha Kim, Hwaseong-si (KR); Joo-Han Bae, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 95 days.

(21) Appl. No.: 13/908,422

(22) Filed: Jun. 3, 2013

(65) Prior Publication Data

US 2014/0184998 A1    Jul. 3, 2014

(30) Foreign Application Priority Data

Jan. 3, 2013   (KR) ................. 10-2013-0000769

(51) Int. Cl.
| | |
|---|---|
| G02F 1/1341 | (2006.01) |
| G02F 1/1333 | (2006.01) |
| G02F 1/1337 | (2006.01) |
| G02F 1/1343 | (2006.01) |

(52) U.S. Cl.
CPC ........ G02F 1/133377 (2013.01); G02F 1/1333 (2013.01); G02F 1/1341 (2013.01); G02F 1/133707 (2013.01); G02F 2001/134318 (2013.01)

(58) Field of Classification Search
None
See application file for complete search history.

(56) References Cited

U.S. PATENT DOCUMENTS

| | | | |
|---|---|---|---|
| 5,386,307 A | * | 1/1995 | Jang ................................ 349/81 |
| 5,668,617 A | * | 9/1997 | Na ................................. 349/156 |
| 6,400,430 B2 | | 6/2002 | Nakao et al. |
| 6,469,761 B1 | | 10/2002 | Drabik et al. |
| 6,912,038 B2 | | 6/2005 | Liao et al. |
| 7,123,319 B2 | | 10/2006 | Broer et al. |
| 7,227,540 B2 | | 6/2007 | Murayama et al. |
| 7,279,111 B2 | | 10/2007 | Conta et al. |
| 7,527,998 B2 | | 5/2009 | Tung et al. |
| 7,541,280 B2 | | 6/2009 | Po et al. |
| 7,566,939 B2 | | 7/2009 | Despont et al. |
| 7,875,548 B2 | | 1/2011 | Gotkis et al. |
| 8,203,686 B2 | | 6/2012 | Hatano et al. |
| 8,222,160 B2 | | 7/2012 | Uozumi |
| 2001/0002340 A1 | | 5/2001 | Eldridge et al. |
| 2002/0006708 A1 | | 1/2002 | Kang et al. |
| 2005/0124149 A1 | | 6/2005 | Kim et al. |
| 2006/0146267 A1 | | 7/2006 | Choi et al. |
| 2008/0135998 A1 | | 6/2008 | Witvrouw et al. |

(Continued)

FOREIGN PATENT DOCUMENTS

| | | |
|---|---|---|
| JP | 2008-256969 | 10/2008 |
| JP | 2010-519724 | 6/2010 |
| KR | 10-0278505 | 10/2000 |
| KR | 10-2012-0026880 | 3/2012 |
| KR | 10-2013-0107379 | 10/2013 |

(Continued)

*Primary Examiner* — Richard Kim
(74) *Attorney, Agent, or Firm* — H.C. Park & Associates, PLC

(57) ABSTRACT

A method to manufacture a display device, includes: forming, on a substrate of the display device, a sacrificial layer including a material, the material including at least one of amorphous carbon, a metal, and an inorganic material; forming a layer covering the sacrificial layer; forming an injection hole exposing the sacrificial layer; removing, via the injection hole, the sacrificial layer to form a microcavity; and disposing liquid crystal in the microcavity.

13 Claims, 38 Drawing Sheets

(56) References Cited

U.S. PATENT DOCUMENTS

| | | |
|---|---|---|
| 2009/0137113 A1 | 5/2009 | Li et al. |
| 2009/0200644 A1 | 8/2009 | Hisaka |
| 2012/0001258 A1 | 1/2012 | Kim |
| 2013/0021540 A1* | 1/2013 | Ito et al. ............................ 349/5 |
| 2014/0042430 A1* | 2/2014 | Inoue et al. ..................... 257/43 |

FOREIGN PATENT DOCUMENTS

| | | |
|---|---|---|
| KR | 10-2013-0134153 | 12/2013 |
| KR | 10-2013-0140325 | 12/2013 |
| KR | 10-2014-0025081 | 3/2014 |
| WO | 2008085667 | 7/2008 |

* cited by examiner

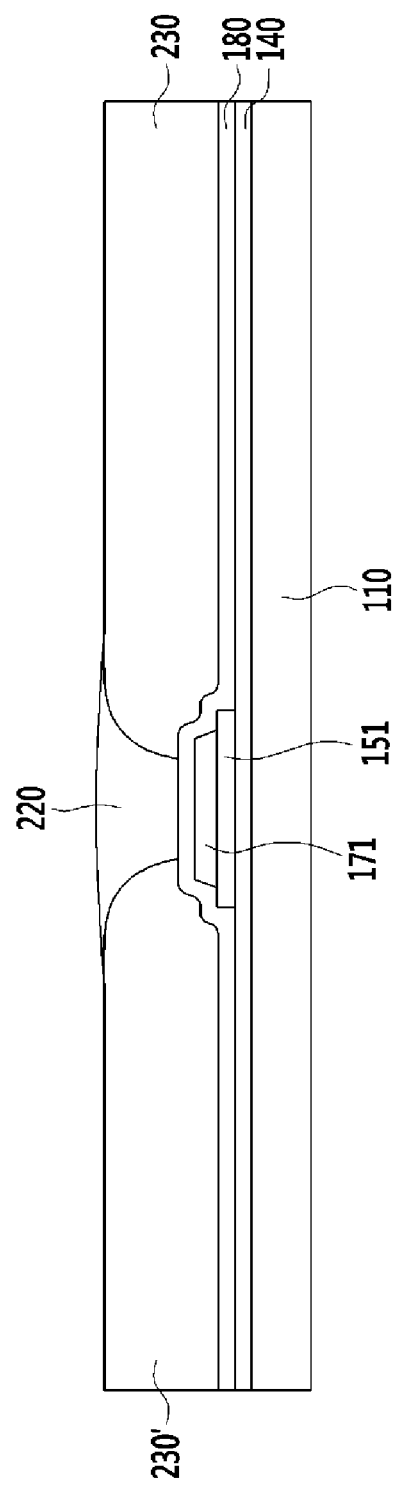

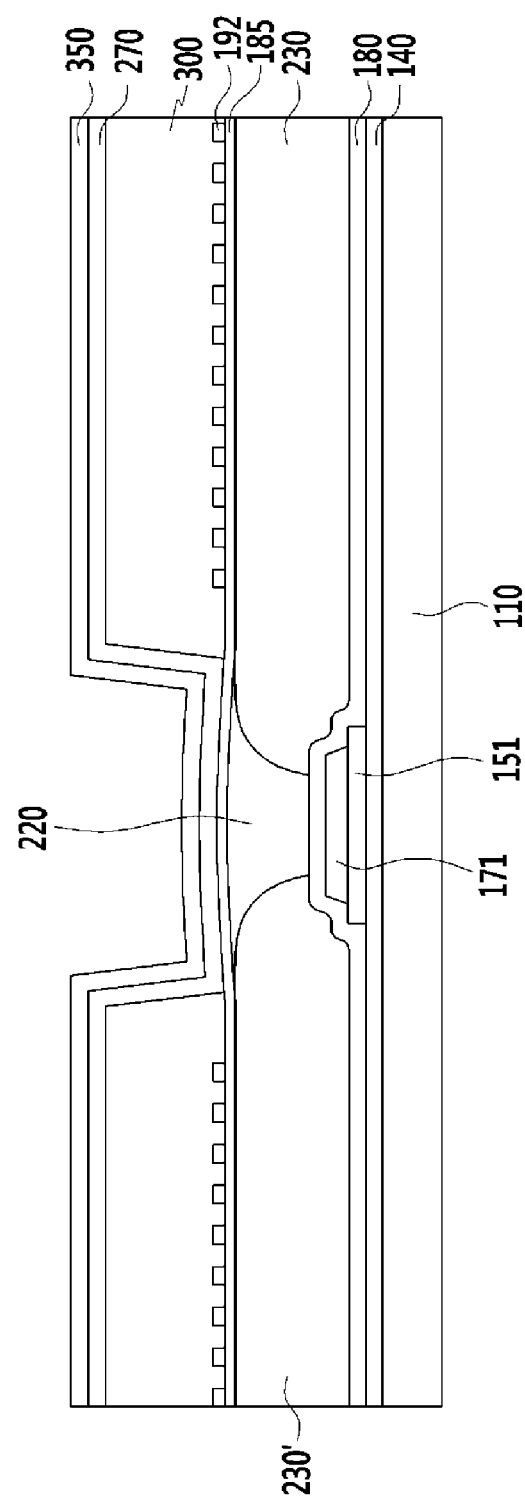

FIG. 17

|  |  | Metal electrode | | | | |
|---|---|---|---|---|---|---|
|  |  | Ni : -0.25V | Mo : - 0.2V | Al : -1.66V | Cu : +0.34V | Cr : +1.33V |
| Transparent electrode | In : -0.342V | Anode : In | Anode : In | Anode : In | Anode : Cu | Anode : Cr |
|  | Zn : - 0.76V | Anode : Zn | Anode : Zn | Anode : Al | Anode : Cu | Anode : Cr |
|  | Sn : -0.13V | Anode : Ni | Anode : Mo | Anode : Al | Anode : Cu | Anode : Cr |

FIG. 18

Standard Reduction Potentials at 298K, 1M, 1atm

| HALF-REACTION | $E°$ (V) |
|---|---|
| $F_{2(g)} + 2e^- \rightarrow 2F^-_{(aq)}$ | +2.87 |
| $O_{3(g)} + 2H^+_{(aq)} + 2e^- \rightarrow O_{2(g)} + H_2O_{(l)}$ | +2.07 |
| $Co^{3+}_{(aq)} + e^- \rightarrow Co^{2+}_{(aq)}$ | +1.82 |
| $H_2O_{2(aq)} + 2H^+_{(aq)} + 2e^- \rightarrow 2H_2O_{(l)}$ | +1.77 |
| $PbO_{2(s)} + 4H^+_{(aq)} + SO_4^{2-}_{(aq)} + 2e^- \rightarrow PbSO_{4(s)} + 2H_2O_{(l)}$ | +1.70 |
| $Ce^{4+}_{(aq)} + e^- \rightarrow Ce^{3+}_{(aq)}$ | +1.61 |
| $MnO_4^-_{(aq)} + 8H^+_{(aq)} + 5e^- \rightarrow Mn^{2+}_{(aq)} + 4H_2O_{(l)}$ | +1.51 |
| $Au^{3+}_{(aq)} + 3e^- \rightarrow Au_{(s)}$ | +1.50 |
| $Cl_{2(g)} + 2e^- \rightarrow 2Cl^-_{(aq)}$ | +1.36 |
| $Cr_2O_7^{2-}_{(aq)} + 14H^+_{(aq)} + 6e^- \rightarrow 2Cr^{3+}_{(aq)} + 7H_2O_{(l)}$ | +1.33 |
| $MnO_{2(s)} + 4H^+_{(aq)} + 2e^- \rightarrow Mn^{2+}_{(aq)} + 2H_2O_{(l)}$ | +1.23 |
| $O_{2(g)} + 4H^+_{(aq)} + 4e^- \rightarrow 2H_2O_{(l)}$ | +1.23 |
| $Br_{2(l)} + 2e^- \rightarrow 2Br^-_{(aq)}$ | +1.07 |
| $NO_3^-_{(aq)} + 4H^+_{(aq)} + 3e^- \rightarrow NO_{(g)} + 2H_2O_{(l)}$ | +0.96 |
| $2Hg^{2+}_{(aq)} + 2e^- \rightarrow Hg_2^{2+}_{(aq)}$ | +0.92 |
| $Hg_2^{2+}_{(aq)} + 2e^- \rightarrow 2Hg_{(l)}$ | +0.85 |
| $Ag^+_{(aq)} + e^- \rightarrow Ag_{(s)}$ | +0.80 |
| $Fe^{3+}_{(aq)} + e^- \rightarrow Fe^{2+}_{(aq)}$ | +0.77 |
| $O_{2(g)} + 2H^+_{(aq)} + 2e^- \rightarrow H_2O_{2(aq)}$ | +0.68 |
| $MnO_4^-_{(aq)} + 2H_2O_{(l)} + 3e^- \rightarrow MnO_{2(s)} + 4OH^-_{(aq)}$ | +0.59 |
| $I_{2(s)} + 2e^- \rightarrow 2I^-_{(aq)}$ | +0.53 |
| $O_{2(g)} + 2H_2O + 4e^- \rightarrow 4OH^-_{(aq)}$ | +0.40 |
| $Cu^{2+}_{(aq)} + 2e^- \rightarrow Cu_{(s)}$ | +0.34 |
| $AgCl_{(s)} + e^- \rightarrow Ag_{(s)} + Cl^-_{(aq)}$ | +0.22 |
| $SO_4^{2-}_{(aq)} + 4H^+_{(aq)} + 2e^- \rightarrow SO_{2(g)} + 2H_2O_{(l)}$ | +0.20 |
| $Cu^{2+}_{(aq)} + e^- \rightarrow Cu^+_{(aq)}$ | +0.16 |
| $Sn^{4+}_{(aq)} + 2e^- \rightarrow Sn^{2+}_{(aq)}$ | +0.13 |
| $2H^+_{(aq)} + 2e^- \rightarrow H_{2(g)}$ | 0.00 |
| $Pb^{2+}_{(aq)} + 2e^- \rightarrow Pb_{(s)}$ | -0.13 |
| $Sn^{2+}_{(aq)} + 2e^- \rightarrow Sn_{(s)}$ | -0.14 |
| $Ni^{2+}_{(aq)} + 2e^- \rightarrow Ni_{(s)}$ | -0.25 |
| $Co^{2+}_{(aq)} + 2e^- \rightarrow Co_{(s)}$ | -0.28 |
| $PbSO_{4(s)} + 2e^- \rightarrow Pb_{(s)} + SO_4^{2-}_{(aq)}$ | -0.31 |
| $Cd^{2+}_{(aq)} + 2e^- \rightarrow Cd_{(s)}$ | -0.40 |
| $Fe^{2+}_{(aq)} + 2e^- \rightarrow Fe_{(s)}$ | -0.44 |
| $Cr^{3+}_{(aq)} + 3e^- \rightarrow Cr_{(s)}$ | -0.74 |
| $Zn^{2+}_{(aq)} + 2e^- \rightarrow Zn_{(s)}$ | -0.76 |
| $2H_2O_{(l)} + 2e^- \rightarrow H_{2(g)} + 2OH^-_{(aq)}$ | -0.83 |
| $Mn^{2+}_{(aq)} + 2e^- \rightarrow Mn_{(s)}$ | -1.18 |
| $Al^{3+}_{(aq)} + 3e^- \rightarrow Al_{(s)}$ | -1.66 |
| $Be^{2+}_{(aq)} + 2e^- \rightarrow Be_{(s)}$ | -1.85 |
| $Mg^{2+}_{(aq)} + 2e^- \rightarrow Mg_{(s)}$ | -2.37 |
| $Na^+_{(aq)} + e^- \rightarrow Na_{(s)}$ | -2.71 |
| $Ca^{2+}_{(aq)} + 2e^- \rightarrow Ca_{(s)}$ | -2.87 |
| $Sr^{2+}_{(aq)} + 2e^- \rightarrow Sr_{(s)}$ | -2.89 |
| $Ba^{2+}_{(aq)} + 2e^- \rightarrow Ba_{(s)}$ | -2.90 |
| $K^+_{(aq)} + e^- \rightarrow K_{(s)}$ | -2.93 |
| $Li^+_{(aq)} + e^- \rightarrow Li_{(s)}$ | -3.05 |

↑ strong oxidizing agents

FIG. 20

| Metal Corroding \ Contact Metal | Magnesium & alloys | Zinc & alloys | Aluminium & alloys | Cadmium | Steel-carbon | Cast iron | Stainless steels | Lead, tin and alloys | Nickel | Brasses, nickel silvers | Copper | Bronzes, cupro-nickels | Nickel copper alloys | Nickel-Chrome-Mo Alloys, Titanium, silver, graphite, Graphite, gold, platinum |
|---|---|---|---|---|---|---|---|---|---|---|---|---|---|---|
| Magnesium & alloys |  | X | X | X | X | X | X | X | X | X | X | X | X | X |
| Zinc & alloys |  |  | X | X | X | X | X | X | X | X | X | X | X | X |
| Aluminium & alloys |  |  |  | X | X | X | X | X | X | X | X | X | X | X |
| Cadmium |  |  |  |  | X | X | X | X | X | X | X | X | X | X |
| Steel-carbon |  |  |  | X |  | X | X | X | X | X | X | X | X | X |
| Cast iron |  |  |  | X |  |  | X | X | X | X | X | X | X | X |
| Stainless steels |  |  |  | X | X |  |  | X | X | X | X | X | X | X |
| Lead, tin and alloys |  |  |  |  |  |  | X |  | X | X | X | X | X | X |
| Nickel |  |  |  |  |  |  |  |  |  | X | X | X | X | X |
| Brasses, nickel silvers |  |  |  |  | X | X | X | X |  |  | X | X | X | X |
| Copper |  |  |  |  |  | X | X | X |  |  |  | X | X | X |
| Bronzes, cupro-nickels |  |  |  |  |  |  |  |  |  |  |  |  | X | X |
| Nickel copper alloys |  |  |  |  |  |  |  |  |  |  |  |  |  | X |
| Nickel-Chrome-Mo Alloys, Titanium, silver, graphite, Graphite, gold, platinum |  |  |  |  |  |  |  |  |  |  |  |  |  |  |

X = Galvanic Corrosion Risk

LIQUID CRYSTAL DISPLAY AND MANUFACTURING METHOD THEREOF

CROSS-REFERENCE TO RELATED APPLICATION

This application claims priority from and the benefit of Korean Patent Application No. 10-2013-0000769, filed on Jan. 3, 2013, which is incorporated by reference for all purposes as if set forth herein.

BACKGROUND

1. Field

Exemplary embodiments relate to display technology, and more particularly, to a liquid crystal display including a liquid crystal layer formed in a microcavity and a manufacturing method thereof.

2. Discussion

Conventional liquid crystal displays typically include two panels with field generating electrodes, such as a pixel electrode, a common electrode, and the like, formed thereon, and a liquid crystal layer disposed therebetween.

To facilitate the display of images, an electric field is typically imposed on the liquid crystal layer by applying voltage to the field generating electrodes. This orients the liquid crystal molecules of the liquid crystal layer and controls polarization of incident light.

Liquid crystal displays including an embedded microcavity (EM) structure (or nanocrystal structure) are display devices manufactured by forming a sacrificial layer with a photoresist, removing the sacrificial layer after forming a support member thereon, and filling liquid crystal in a void (or empty space, cavity, etc.) formed as a result of the sacrificial layer being removed.

It is noted, however, that a side wall of conventional EM structures is usually tapered, and this portion is typically covered by a light blocking member to, for instance, decrease the aperture ratio of the corresponding display device. That is, a side wall of the EM structure usually includes a structure being tapered at an angle, and since light leakage may occur in the liquid crystal layer disposed in the EM structure due to a cell gap being different from other portions thereof, the region is usually covered by a light blocking member. This causes the aperture ratio to be reduced.

Also, when an organic layer is used as a sacrificial layer, the formation of the organic layer may undesirably affect (or otherwise change) the surrounding layers by, for instance, heat (or some other processing characteristic) associated with one or more processing steps. Further, a portion where the organic layer is not removed from the void may result. As a result, liquid crystal material may not be sufficiently injected in the void, which may adversely influence display quality of the corresponding display device.

Therefore, there is a need for an approach that provides efficient, cost effective techniques to provide a display device including an EM structure formed without using an organic sacrificial layer.

The above information disclosed in this Background section is only for enhancement of understanding of the background of the invention, and therefore, it may contain information that does not form the prior art that is already known in this country to a person of ordinary skill in the art.

SUMMARY

Exemplary embodiments provide a liquid crystal display including liquid crystal disposed in a microcavity formed without using an organic sacrificial layer.

Exemplary embodiments provide a method to manufacture the above-noted liquid display device.

Additional aspects will be set forth in the detailed description which follows and, in part, will be apparent from the disclosure, or may be learned by practice of the invention.

According to exemplary embodiments, a method, includes: forming, on a substrate of a display device, a sacrificial layer including a material, the material including at least one of amorphous carbon, a metal, and an inorganic material; forming a layer covering the sacrificial layer; forming an injection hole exposing the sacrificial layer; removing, via the injection hole, the sacrificial layer to form a microcavity; and disposing liquid crystal in the microcavity.

According to exemplary embodiments, a liquid crystal display, includes: a is substrate; and a microcavity layer disposed on the substrate, the microcavity layer including a plurality of microcavities. At least one of the plurality of microcavities includes: a side surface angled at 80° to 100° with respect to the substrate, a pixel electrode disposed therein, and liquid crystal disposed therein.

According to exemplary embodiments, since the sacrificial layer comprises at least one of amorphous carbon, metal, or an inorganic material, formation of the sacrificial layer may not undesirably affect other surrounding layers by, for example, heat (or some other processing characteristic) associated with one or more manufacturing processes. To this end, removal of the sacrificial layer is substantially easy, and deterioration of display quality of a corresponding display device associated with injecting liquid crystal into the microcavity may be prevented (or otherwise reduced). Further, since the slope of the side wall is approximately vertical, an area to be covered by, for instance, a light blocking member may be reduced, which increases an aperture ratio of the corresponding display device.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 7B is a cross-sectional view of the display device of FIG. 7A, according to exemplary embodiments.

FIGS. 10A-10D illustrate the display device of FIG. 1 at another stage of the manufacturing process, according to exemplary embodiments.

FIGS. 17-20 respectively illustrate relations between a transparent electrode and a metal sacrificial layer, according to exemplary embodiments.

DETAILED DESCRIPTION OF THE ILLUSTRATED EMBODIMENTS

Figure 1:
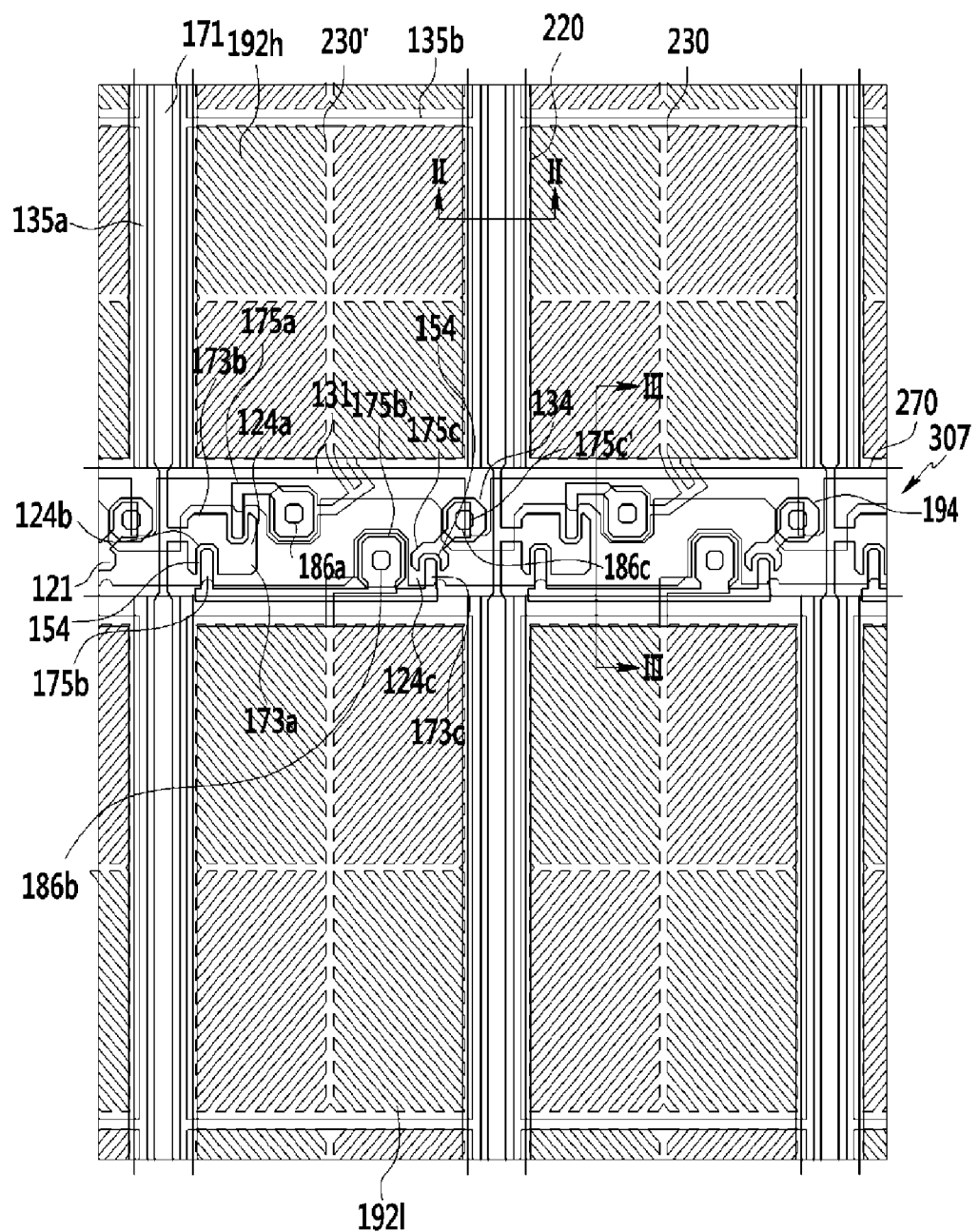
FIG. 1 is a layout view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes, and thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

While exemplary embodiments are described in association with liquid crystal display devices, it is contemplated that exemplary embodiments may be utilized in association with other or equivalent display devices, such as various self-emissive and/or non-self-emissive display technologies. For instance, self-emissive display devices may include organic light emitting displays (OLED), plasma display panels (PDP), etc., whereas non-self-emissive display devices may include electrophoretic displays (EPD), electrowetting displays (EWD), and/or the like.

Figure 2:
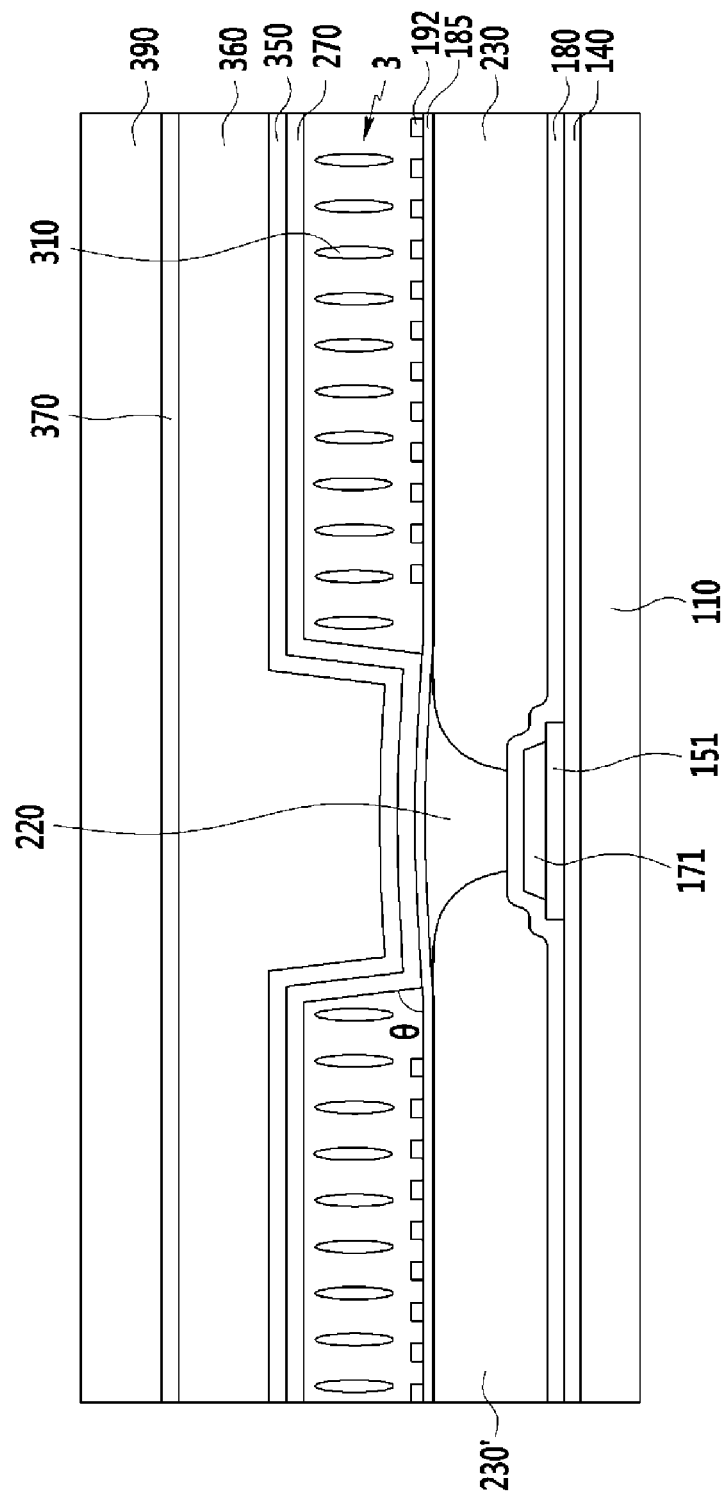
FIG. 2 is a cross-sectional view of the display device of FIG. 1 taken along sectional line II-II, according to exemplary embodiments.
Figure 3:
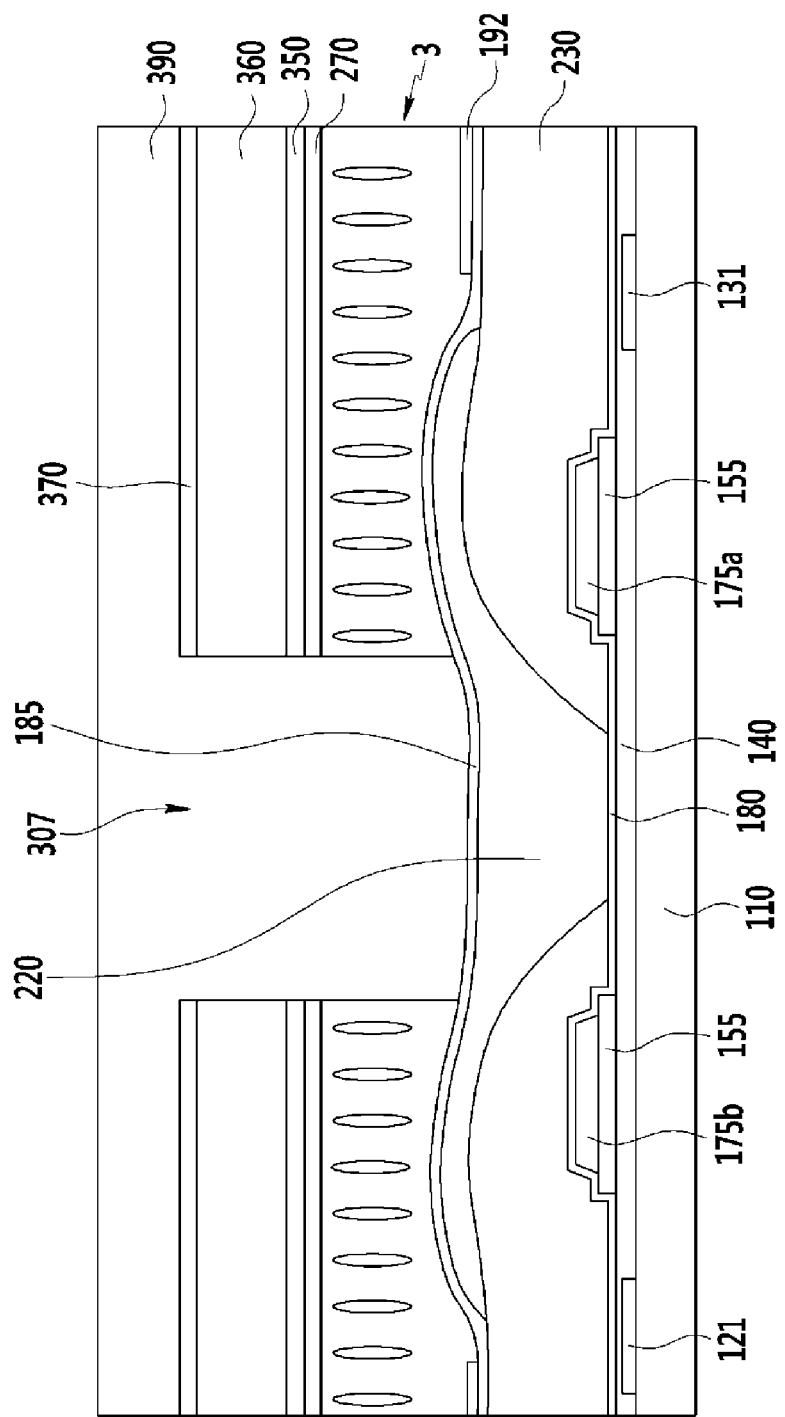
FIG. 3 is a cross-sectional view of the display device of FIG. 1 taken along sectional line III-III, according to exemplary embodiments.

FIG. 1 is a layout view of a display, according to exemplary embodiments. FIG. 2 is a cross-sectional view of the display device of FIG. 1 taken along sectional line II-II. FIG. 3 is a cross-sectional view of the display device of FIG. 1 taken along sectional line III-III.

A gate line 121 and a storage voltage line 131 are formed on an insulation substrate 110 made of any suitable material, such as, for example, transparent glass, plastic, and/or the like. The gate line 121 includes a first gate electrode 124a, a second gate electrode 124b, and a third gate electrode 124c. The storage voltage line 131 includes storage electrodes 135a and 135b, and a protrusion 134 protruding in a direction parallel (or substantially parallel) to the storage electrode 135a. The structure of the storage electrodes 135a and 135b surrounds a first subpixel electrode 192h and a second subpixel electrode 192l of an adjacent (or previous) pixel. A horizontal portion 135b of the storage electrode may be a wire connected to a horizontal portion 135b of an adjacent (or previous) pixel, which may not be separated from each other.

A gate insulating layer 140 is formed on the gate line 121 and the storage voltage line 131. A semiconductor 151 positioned below a data line 171, a semiconductor 155 positioned below source/drain electrodes, and a semiconductor 154 positioned at a channel portion of a thin film transistor are formed on the gate insulating layer 140.

A plurality of ohmic contacts (not shown) may be formed on each of the semiconductors 151, 154, and 155, as well as disposed between the data line 171 and the source/drain electrodes 173a-c/175a-c.

Data conductors 171, 173c, 175a, 175b, and 175c are formed on each of the semiconductors 151, 154, and 155 and the gate insulating layer 140. The data conductors 171, 173c, 175a, 175b, and 175c, include a plurality of data lines 171, which include a first source electrode 173a and a second source electrode 173b, a first drain electrode 175a, a second drain electrode 175b, a third source electrode 173c, and a third drain electrode 175c.

The first gate electrode 124a, the first source electrode 173a, and the first drain electrode 175a form a first thin film transistor together with the semiconductor 154. A channel of the first thin film transistor is formed at the semiconductor portion 154 between the first source electrode 173a and the first drain electrode 175a. Similarly, the second gate electrode 124b, the second source electrode 173b, and the second drain electrode 175b form a second thin film transistor together with the semiconductor 154. A channel of the second thin film transistor is formed at the semiconductor portion 154 between the second source electrode 173b and the second drain electrode 175b. The third gate electrode 124c, the third source electrode 173c, and the third drain electrode 175c form a third thin film transistor together with the semiconductor 154. A channel of the third thin film transistor is formed at the semiconductor portion 154 between the third source electrode 173c and the third drain electrode 175c.

According to exemplary embodiments, the structure of the data line 171 includes a width that becomes smaller in a forming region of the third thin film transistor in the vicinity of an extension 175c' of the third drain electrode 175c. The aforementioned structure of the data line 171 maintains an interval with adjacent wiring, as well as reduces signal interference. It is contemplated, however, that the aforementioned structure of the data 171 may be additionally or alternatively formed.

A first passivation layer 180 is formed on the data conductors 171, 173a, 173b, 173c, 175a, 175b, and 175c and an exposed portion of the semiconductor 154. The first passivation layer 180 may include any suitable material, e.g., an inorganic insulator, such as, for example, silicon nitride (SiNx), silicon oxide (SiOx), etc. Additionally or alternatively, the first passivation layer 180 may include an organic insulator.

Color filters 230 and 230' are formed on the passivation layer 180. Color filters 230 of the same color are formed in adjacent pixels that are adjacent in a vertical direction (e.g., a direction parallel to data line 171). Color filters 230 and 230' of different colors are formed in adjacent pixels that are adjacent in a horizontal direction (e.g., a direction parallel to gate line 121). It is contemplated that color filters 230 and 230' may overlap respective portions of the data line 171. The color filters 230 and 230' may be configured to facilitate the display of at least one color, such as one of the primary colors, e.g., red, green, and blue. However, it is also contemplated that the color filters 230 and 230' may facilitate the display of any other suitable color, such as cyan, magenta, yellow, and white colors. It is noted that color filters 230 and 230' may be collectively referred to as color filter 230.

A light blocking member (or black matrix) 220 is formed on the color filter 230 and 230'. According to exemplary embodiments, the light blocking member 220 may include any suitable material through which light is not transmitted. Further, the light blocking member 220 is formed with respect to a region (also referred to as a transistor formation region) where the gate line 121, the thin film transistor, and the data line 171 are formed. The light blocking member 220 forms a lattice structure including an opening corresponding to a region where an image is displayed. As such, a color filter (e.g., color filter 230), a pixel electrode (e.g., pixel electrode 192), and a liquid crystal layer (e.g., liquid crystal layer 3) are positioned at least in the opening of the light blocking member 220.

A second passivation layer 185 is disposed on the light blocking member 220 and the color filters 230 and 230', so as to cover the light blocking member 220 and the color filters 230 and 230'. According to exemplary embodiments, the second passivation layer 185 may include any suitable material, such as, for example, an inorganic insulator, e.g., silicon nitride (SiNx), silicon oxide (SiOx), etc., or an organic insulator. Unlike as shown in FIGS. 2 and 3, when a step associated with a difference in thicknesses occurs between the color filters 230 and 230' and the light blocking member 220, the second passivation layer 185 including, for instance, an organic insulator may reduce (or otherwise remove) the step.

A first contact hole (or via) 186a and a second contact hole (or via) 186b respectively expose the first drain electrode 175a and extensions 175b' of the second drain electrode 175b. In this manner, the first contact hole 186a and the second contract hole 186b are formed through the color filter 230, the light blocking member 220, and the passivation layers 180 and 185. Further, a third contact hole (or via) 186c exposes the protrusion 134 of the storage voltage line 131 and the extension 175c' of the third drain electrode 175c. In this manner, the third contact hole 186c is formed through the color filter 230, the light blocking member 220, and the passivation layers 180 and 185.

According to exemplary embodiments, the light blocking member 220 and the color filter 230 include the contact holes 186a, 186b, and 186c extending therethrough. In this manner, the formation (e.g., etching) of the contact holes 186a, 186b, 186c may be difficult due to material differences between the light blocking member 220 and the color filter 230, as compared to the materials of the passivation layers 180 and 185. As such, the light blocking member 220 and/or the color filter 230 may be removed (e.g., etched) at positions corresponding to the contact holes 186a, 186b, and 186c before the contact holes 186a, 186b, and 186c are formed.

According to exemplary embodiments, the contact holes 186a, 186b, and 186c may be formed by changing a position of the light blocking member 220 and etching only the color filter 230 and the passivation layers 180 and 185.

A pixel electrode 192, including the first subpixel electrode 192h and the second subpixel electrode 192l, is formed on the second passivation layer 185. The pixel electrode 192 may be made of any suitable material, such as, for example, a transparent conductive material, e.g., aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline, poly(3,4-ethylenedioxythiophene) poly(styrenesulfonate) (PEDOT:PSS), etc.

The first subpixel electrode 192h and the second subpixel electrode 192l are adjacent to each other in a column (e.g., vertical) direction (e.g., a direction parallel to the extension of data line 171). First and second subpixel electrodes 192h and 192l include an entirely quadrangular shape, and a cross stem configuring a transverse stem and a longitudinal stem crossing the transverse stem. Further, the first subpixel electrode 192h and the second subpixel electrode 192l may be divided into four subregions by the transverse stem and the longitudinal stem. In this manner, each subregion may include a plurality of minute branches. While exemplary embodiments are described herein in association with the aforementioned configuration of subpixel electrodes 192h and 192l, it is also contemplated that first and second subpixel electrodes 192h and 192l may be otherwise configured.

According to exemplary embodiments, the minute branches of the first subpixel electrode 192h and the second subpixel electrode 192l form angles of about 40 degrees to 45 degrees with the gate line 121 or the transverse stem. Further, the minute branches of two adjacent subregions may be perpendicular to each other. In other words, the minute branches of four adjacently disposed subregions may converge (or diverge) from a central portion of a corresponding subpixel, e.g., a central portion where the transverse stem and longitudinal stem cross one another. Further, while not illustrated, a width of each (or some) of the minute branches may become gradually larger (or smaller) and/or intervals between the, or some of the, minute branches may be different from each other.

In exemplary embodiments, the first subpixel electrode 192h and the second subpixel electrode 192l are physically and electrically connected with the first drain electrode 175a and the second drain electrode 175b through the first and second contact holes 186a and 186b. As such, the first and second subpixel electrodes 192h and 192l receive data voltages from the first drain electrode 175a and the second drain electrode 175b, respectively.

A connecting member 194 electrically connects the extension 175c' of the third drain electrode 175c and the protrusion 134 of the storage voltage line 131 through the third contact hole 186c. As a result, some of the data voltage applied to the second drain electrode 175b may be divided through the third source electrode 173c. As such, the magnitude of a voltage applied to the second subpixel electrode 192l may be smaller than the magnitude of a voltage applied to the first subpixel electrode 192h.

According to exemplary embodiments, an area of the second subpixel electrode 192l may be the same or up to double an area of the first subpixel electrode 192h.

An opening (not shown) may be configured to collect gas discharged from the color filter 230 and an overcoat (not illustrated) covering the corresponding opening with the same material as the pixel electrode 192 may be formed on the second passivation layer 185. The opening and the overcoat may be utilized to block gas discharged from the color filter 230, which blocks the gas from being transferred to another element. It is noted that the opening and the overcoat may not be included in exemplary embodiments.

The liquid crystal layer 3 is formed on the second passivation layer 185 and the pixel electrode 192. A space where the liquid crystal layer 3 is positioned is referred to as a microcavity layer. The microcavity layer is supported by an overlying roof layer 360. In exemplary embodiments, the microcavity layer includes a plurality of microcavities (e.g. microcavity 305 illustrated in FIGS. 13C-13E), each microcavity corresponding to a pixel of the display device. In this manner, each of the microcavities includes liquid crystal molecules 310, as will become more apparent below. In this manner, however, it is noted that the liquid crystal layer 3 is formed in the microcavities, such as microcavity 305.

Figure 13A:
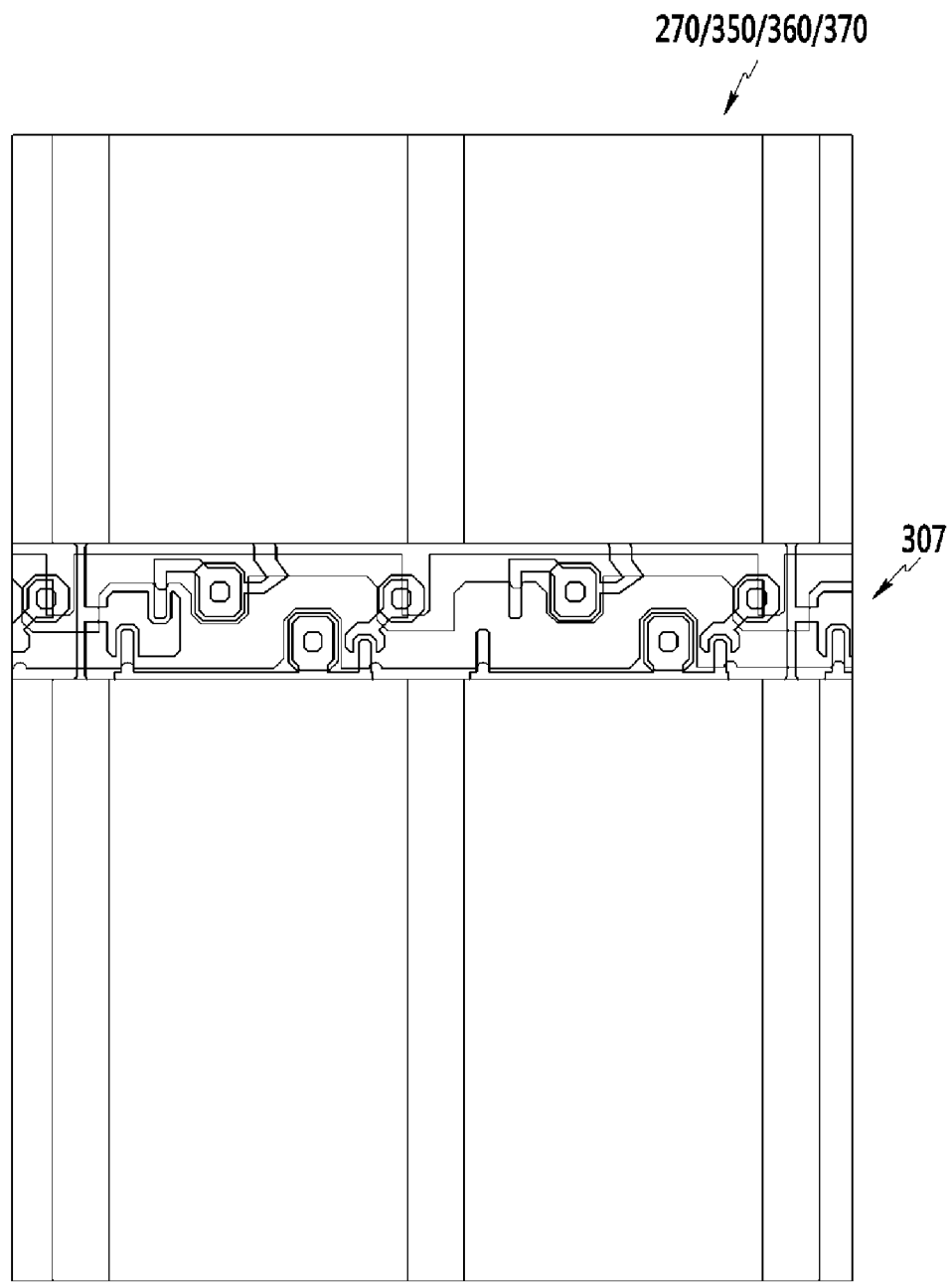
FIGS. 13A-13E illustrate the display device of FIG. 1 at various stages of the manufacturing process, according to exemplary embodiments.
Figure 13B:
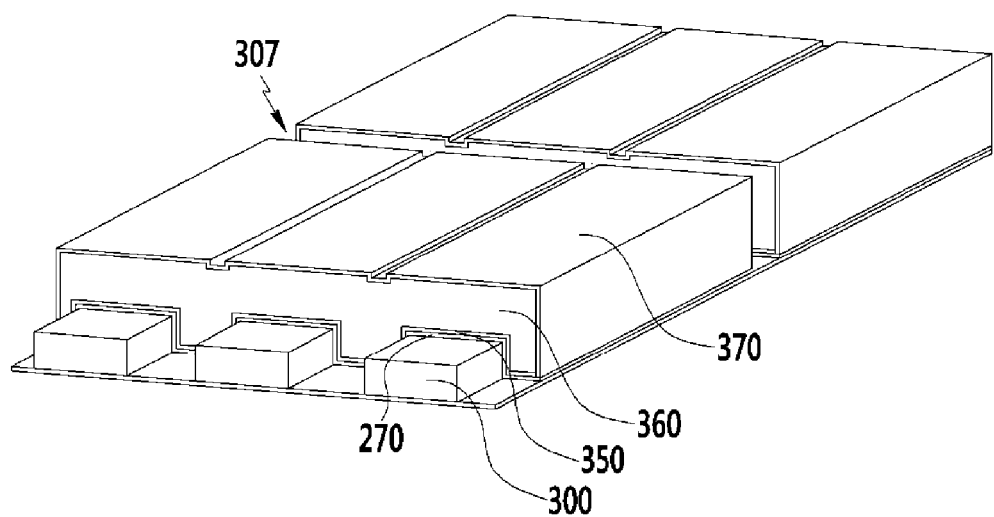
Figure 13C:
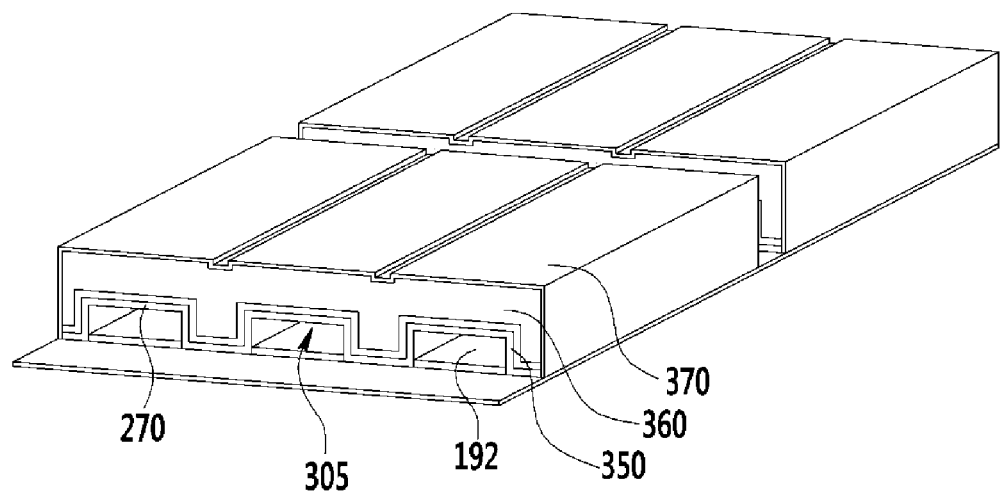
Figure 13D:
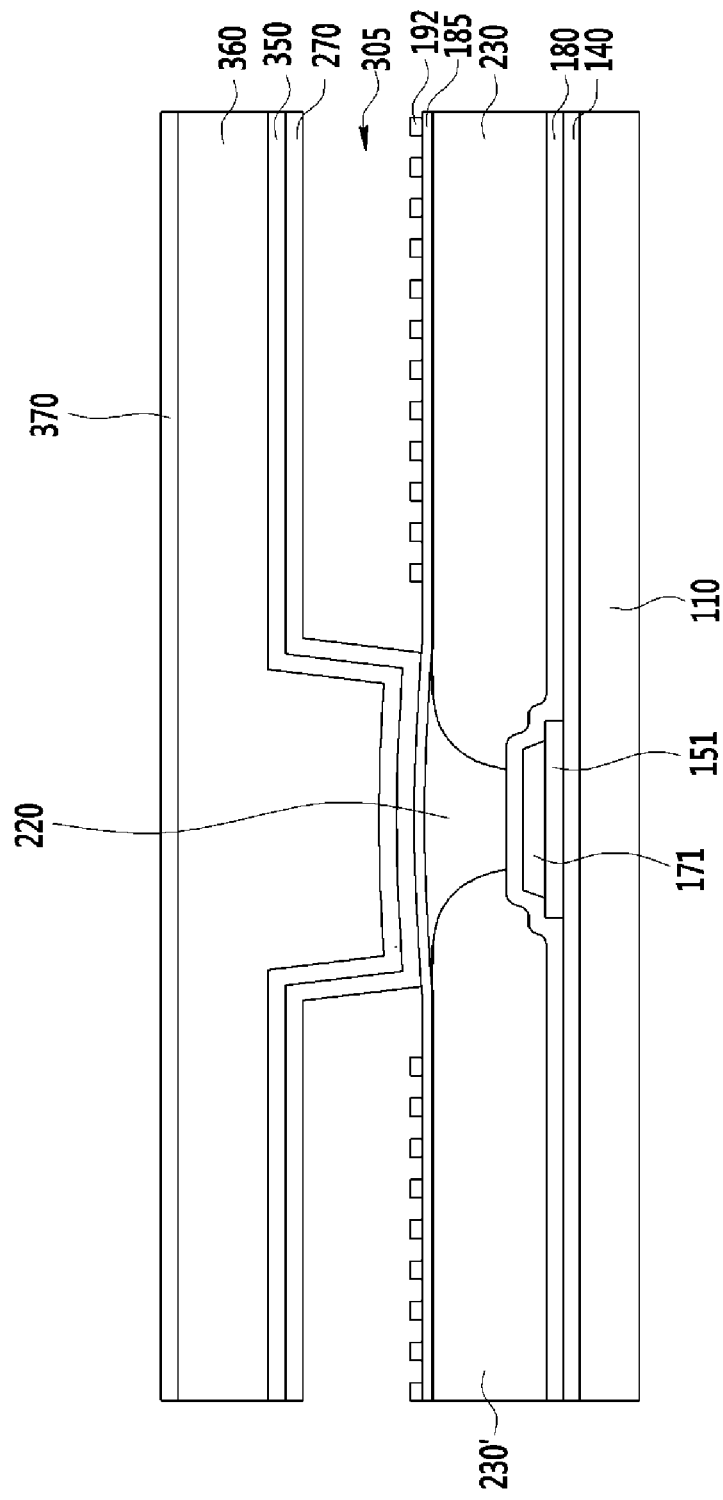
Figure 13E:
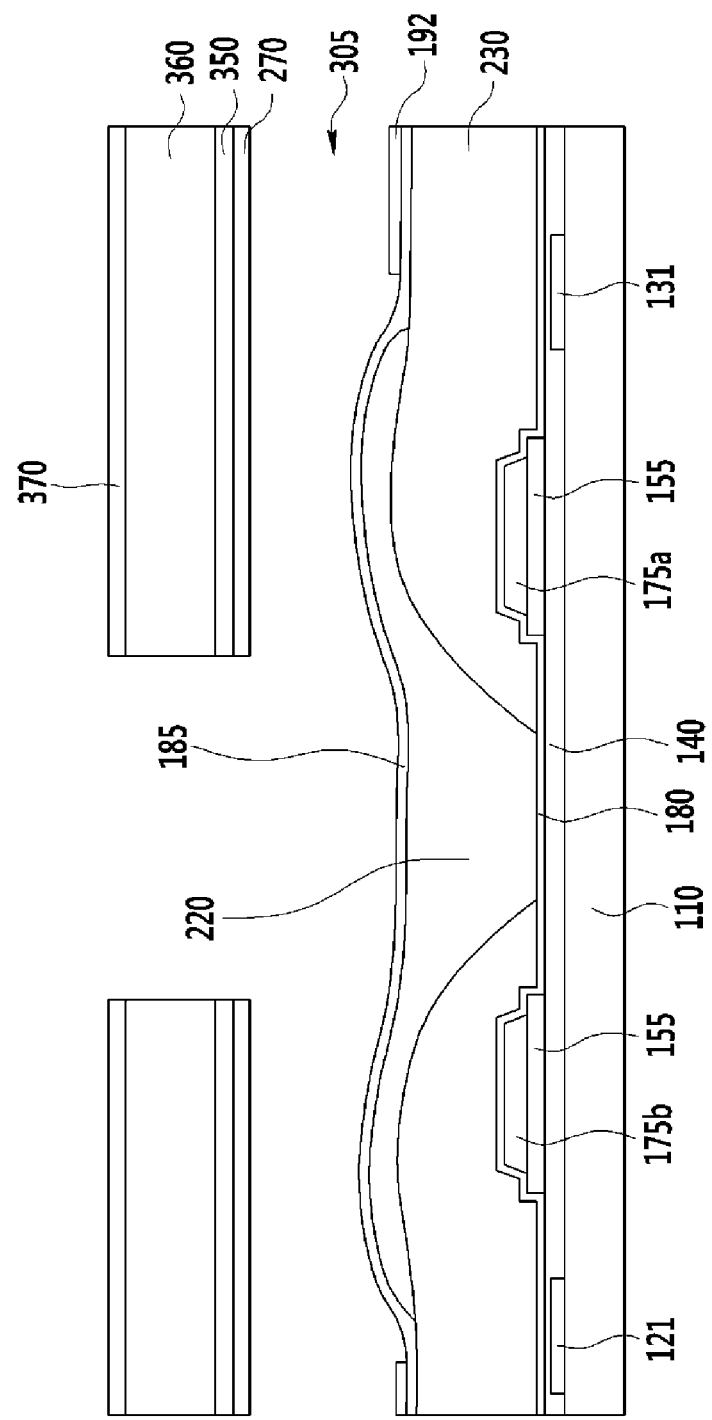
Figure 15:
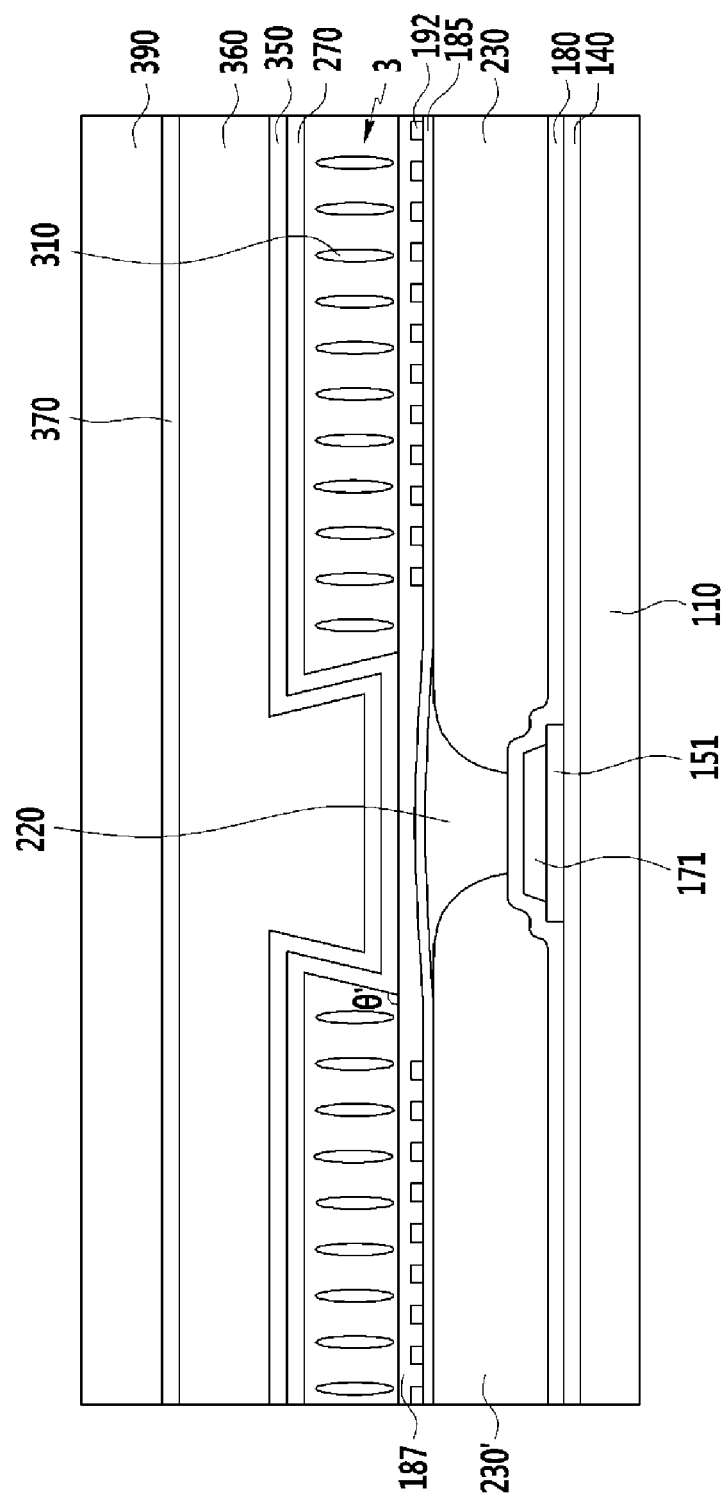
FIG. 15 is a cross-sectional view of a display device, according to exemplary embodiments.

As seen in FIGS. 13C-13E, an upper surface of the microcavity 305 is (or is substantially) a horizontal surface. A side surface of the microcavity 305 is angled at 80 degrees to 100 degrees with respect to a surface of the substrate 110. In this manner, the side surface is (or is substantially) vertical. As seen in FIG. 2, the angle ($\theta$) at which the side surface is angled forms a tapered structure including an angle of more than 80 degrees to an angle of less than 90 degrees. As seen in FIG. 15, the angle ($\theta'$) at which the side surface is angled forms a reverse tapered structure including an angle of more than 90 degrees to an angle of less than 100 degrees.

According to exemplary embodiments, the microcavity 305 may include the approximately vertical structure, as the sacrificial layer used to form the microcavity 305 is not formed of an organic layer, but is formed from at least one of amorphous carbon, a metal, and an inorganic material. In contrast, when the sacrificial layer is formed of an organic material, the pattern of the organic material typically includes a side surface inclined at an angle of less than 45 degrees, such that an area occupied by the side surface is relatively larger. As such, a corresponding horizontal area covered by the light blocking member 220 is relatively larger, which reduces the aperture ratio of a corresponding display device. According to exemplary embodiments, however, the sacrificial layer is formed of at least one of amorphous carbon, metal, and an inorganic material, i.e., not an organic material, and as such, a side surface of the microcavity 305 may be included with respect to a surface of the substrate 110 at an angle of 90 ±10 degrees. In this manner, the horizontal area associated with the side surface is relatively smaller, and as such, the aperture ratio may be increased in the corresponding display device.

As previously noted, the liquid crystal layer 3 is formed in the microcavity 305. An alignment layer (not shown) may be formed in the microcavity 305 to align liquid crystal molecules 310 disposed in the microcavity 305. The alignment layer may include any suitable material, such as, for example, polyamic acid, polysiloxane, polyimide, etc.

The liquid crystal molecules 310 are initially aligned by the alignment layer, and the alignment direction thereof is changed according to an applied electric field imposed, at least in part, by way of pixel electrode 192. A height (or thickness) of the liquid crystal layer 3 corresponds to a height (or thickness) of the microcavity 305. The liquid crystal layer 3 disposed in a microcavity (e.g. microcavity 305) is also referred to as a nanocrystal layer 3.

In exemplary embodiments, a portion of the microcavity layer is opened to form an injection hole 307. As such, the liquid crystal molecules 310 may be injected into the microcavity 305 by way of a capillary force. In this manner, the alignment layer may also be formed by capillary force. The injection hole 307 may be sealed by a capping layer 390 after the alignment layer and the liquid crystal molecules 310 are injected into the microcavity 305.

A common electrode 270 is positioned on the second passivation layer 185 and the pixel electrode 192, as well as disposed above the liquid crystal layer 3. A portion of the structure of the common electrode 270 extends along the upper surface of the microcavity 305. Another portion of the structure of the common electrode 307 extends along the side surface of the microcavity 305. In this manner, the horizontal portion of the common electrode 370 may extend in (or substantially in) the same direction as the gate line 121. The another portion of the structure of the common electrode 270 extends towards insulation substrate 110 along the side surface of microcavity 305 so as to be close to (e.g., extend towards) and above the data line 171. Further, the common electrode 270 may not be formed in a portion where the injection hole 307 is formed (e.g., not formed in a region where the transistor is formed). According to exemplary embodiments, the common electrode 270 may be horizontally maintained above the microcavity 305 because the common electrode 270 may be supported by a roof layer 360, which is described in more detail below.

According to exemplary embodiments, a plurality of common electrodes 270 may be formed separately from each other with respect to injection hole 307. As such, the plurality of common electrodes 270 may be formed with an interval therebetween, e.g., the plurality of common electrodes 370 may be spaced apart from one another.

The common electrode 270 may include any suitable transparent conductive material, such as, for example, AZO, GZO, ITO, IZO, etc. It is also contemplated that the common electrode 270 may be formed from one or more conductive polymers, e.g., polyaniline, PEDOT:PSS, etc. According to exemplary embodiments, the common electrode 270 may serve to generate an electric field together with the pixel electrode 192, and thereby, configured to control an alignment direction of the liquid crystal molecules 310.

As seen in FIG. 2, a lower insulating layer 350 is formed on the common electrode 270. In exemplary embodiments, the lower insulating layer 350 may include any suitable material, such as, for example, an inorganic insulating material, e.g., silicon nitride (SiNx), silicon oxide (SiOx), etc.

The roof layer 360 is formed on the lower insulating layer 350. The roof layer 360 may serve to support a space (microcavity) to be formed between the pixel electrode 192 and the common electrode 270. In exemplary embodiments, the roof layer 360 may be formed of an organic insulating material.

An upper insulating layer 370 is formed on the roof layer 360. The upper insulating layer 370 may include any suitable inorganic insulating material, e.g., SiNx, SiOx, etc.

The lower insulating layer 350, the roof layer 360, and the upper insulating layer 370 may include the injection hole 307 positioned on one side surface (e.g., formed in a portion corresponding to the transistor formation region), to enable liquid crystal to be injected into the microcavity 305. The injection hole 307 may be used even when removing the sacrificial layer (not shown) for forming the microcavity 305.

According to exemplary embodiments, the lower insulating layer 350 and the upper insulating layer 370 may be omitted.

A capping layer 390 may be formed on the upper insulating layer 370 to, for instance, seal the injection hole 307. In exemplary embodiments, the injection hole 307 is sealed by the capping layer 390, which prevents the liquid crystal molecules 310 from leaking therefrom. As shown in FIGS. 2 and 3, the capping layer 390 may be formed throughout the entire region of the display device, and according to exemplary embodiments, the capping layer 390 may only be formed on and near the injection hole 307. The upper surface formed with the capping layer 390 may be horizontal, e.g., parallel or substantially parallel to the lower surface of the insulation substrate 110.

Corresponding polarizers (not shown) may be respectively positioned under the insulation substrate 110 and on the capping layer 390. The polarizers may include a polarization element for polarization and a tri-acetyl-cellulose (TAC) layer for ensuring durability. According to exemplary embodiments, directions of the transmissive axes of the polarizer disposed on the capping layer 390 and the polarizer disposed below the insulation substrate 110 may be perpendicular or parallel to each other.

An exemplary process to manufacture the display is described in more detail with reference to FIGS. 4-13.

FIGS. 4-13 are respective cross-sectional views of the display device of FIG. 1 during a process of manufacturing the display device of FIG. 1, according to exemplary embodiments.

Figure 4:
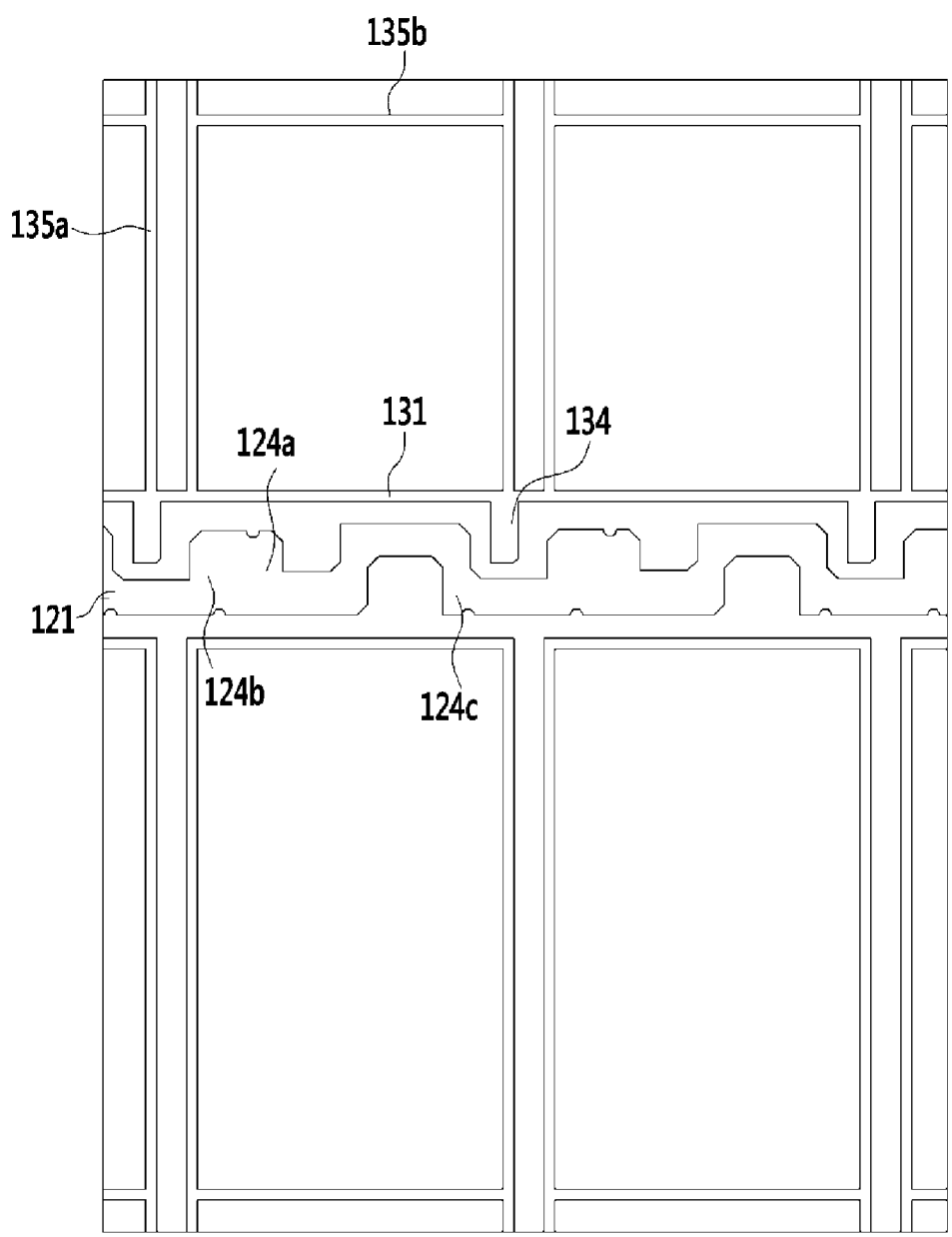
FIGS. 4-6 are respective plan views of the display device of FIG. 1 at various stages of manufacture, according to exemplary embodiments.

FIG. 4 is a layout view of the display device of FIG. 1 at a first stage of the manufacturing process, according to exemplary embodiments.

Referring to FIG. 4, the gate line 121 and the storage voltage line 131 are formed on the insulation substrate 110 made of, for instance, transparent glass, plastic, and/or the like. The gate line 121 and the storage voltage line 131 may be formed of the same material, as well as formed together with the same mask. As previously described, the gate line 121 includes a first gate electrode 124a, a second gate electrode 124b, and a third gate electrode 124c, and the storage voltage line 131 includes storage electrodes 135a and 135b, as well as includes a protrusion 134 protruding in a direction parallel (or substantially parallel) to the storage electrode 135a. Adverting momentarily to FIG. 1, the structure of the storage electrodes 135a and 135b surrounds a first subpixel electrode 192h and a second subpixel electrode 192l of an adjacent (or previous) pixel. A gate voltage is applied to the gate line 121 and a storage voltage is applied to the storage voltage line 131. As such, the gate line 121 and the storage voltage line 131 are separated from each other. The storage voltage may include a constant voltage level or may include a swing (or otherwise variable) voltage level.

In exemplary embodiments, a gate insulating layer 140 covering the gate line 121 and the storage voltage line 131 is formed on the gate line 121 and the storage voltage line 131.

In second and third stages of the manufacturing process, semiconductors 151, 154, and 155, a data line 171, and source/drain electrodes 173a, 173b, 173c, 175a, 175b, and 175c are formed on the gate insulating layer 140.

Figure 5:
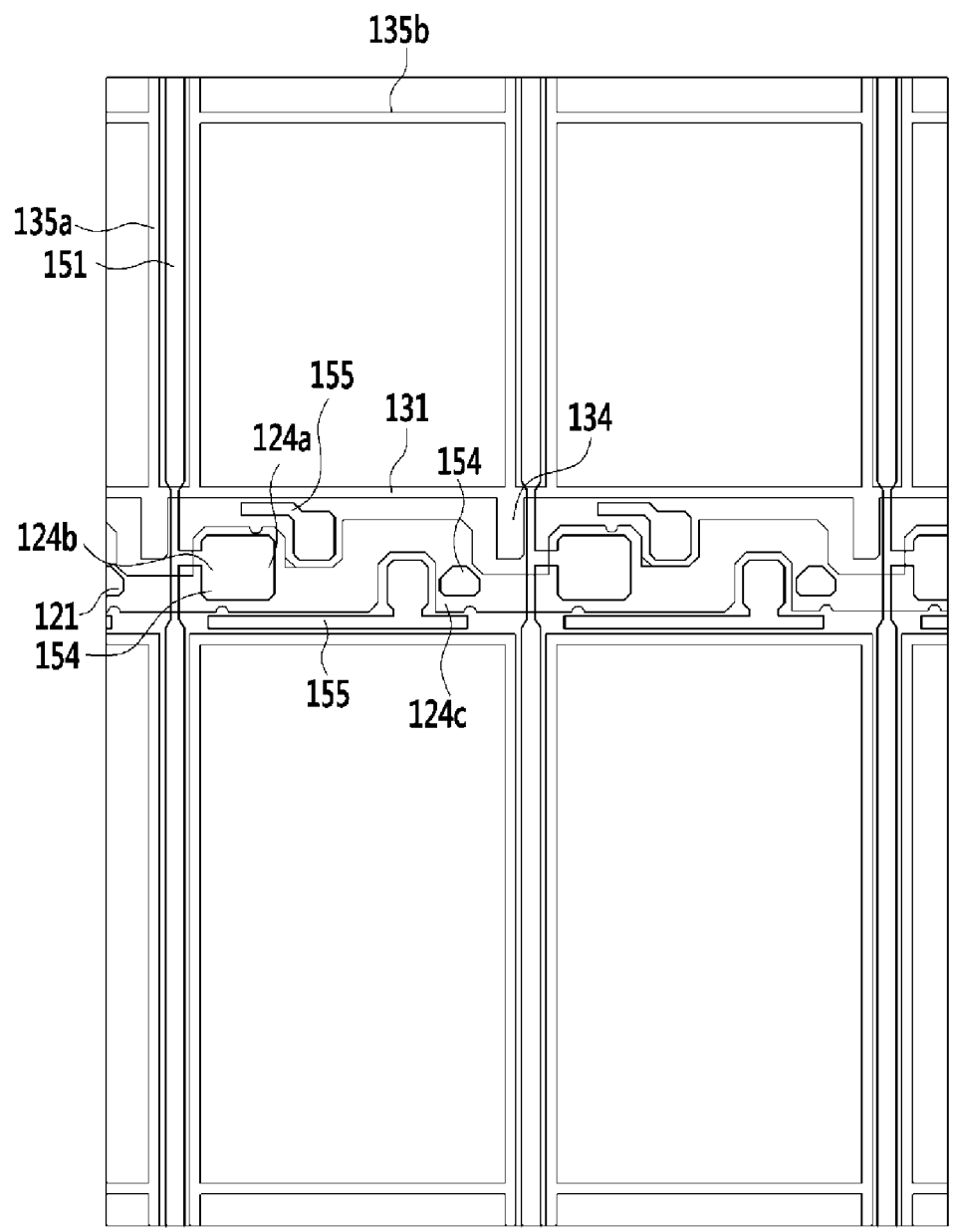
Figure 6:
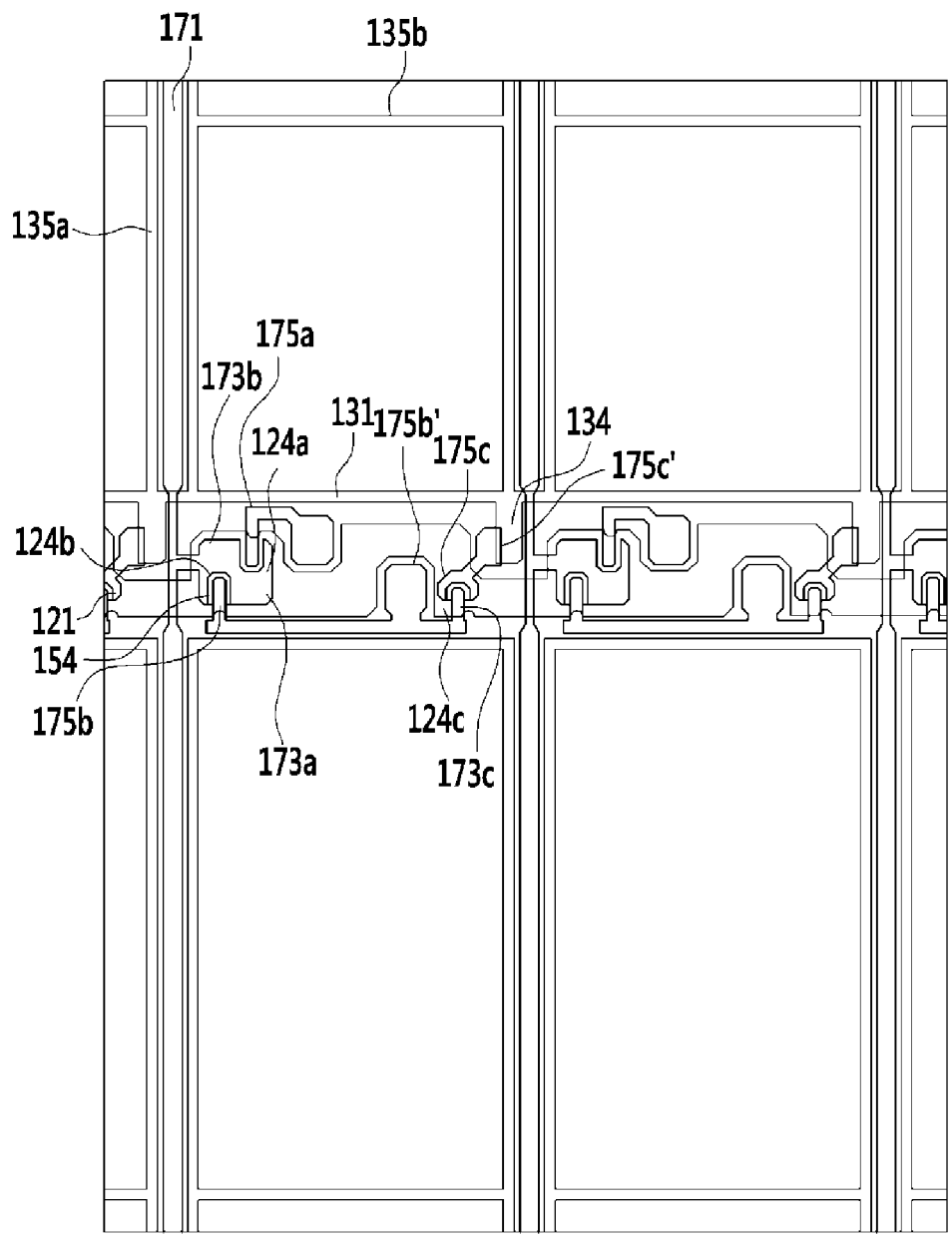

FIG. 5 is a layout view of the display device of FIG. 1 at a second stage of the manufacturing process, according to exemplary embodiments. FIG. 6 is a layout view of the display device of FIG. 2 at a third stage of the manufacturing process, according to exemplary embodiments. It is noted that FIG. 5 includes semiconductors 151, 154, and 155 being formed, whereas FIG. 6 includes the data line 171 and the source/drain electrodes 173a, 173b, 173c, 175a, 175b, and 175c being formed. According to exemplary embodiments, however, the semiconductors 151, 154, and 155, the data line 171, and the source/drain electrodes 173a, 173b, 173c, 175a, 175b, and 175c may be formed together, as described below.

For instance, a material for the semiconductors 151, 154, and 155 and a material for the data line 171/the source electrodes 173a, 173b, and 173c/the drain electrodes 175a, 175b, and 175c may be deposited (e.g., sequentially deposited). In this manner, two patterns may be formed together via an exposure, developing, and etching process by using a mask (e.g., a slit mask or transflective mask). In order for the semiconductor 154 positioned at the channel part of the first thin film transistor to not be etched, the corresponding portion is exposed through the slit or transflective region of the mask. While only one exposure, developing, and etching process has been described, it is also contemplated that multiple exposure, developing, and etching processes may be utilized.

A plurality of ohmic contacts (not shown) may be formed on the respective semiconductors 151, 154, and 155 and between the data line 171 and the source/drain electrodes 173a, 173b, 173c, 175a, 175b, and 175c.

Further, the first passivation layer 180 is formed on all of the data conductors 171, 173a, 173b, 173c, 175a, 175b, and 175c and the exposed portion of the semiconductor 154. As previously noted, the first passivation layer 180 may include any suitable inorganic insulator, such as SiNx, SiOx, etc., and/or an organic insulator.

Figure 7A:
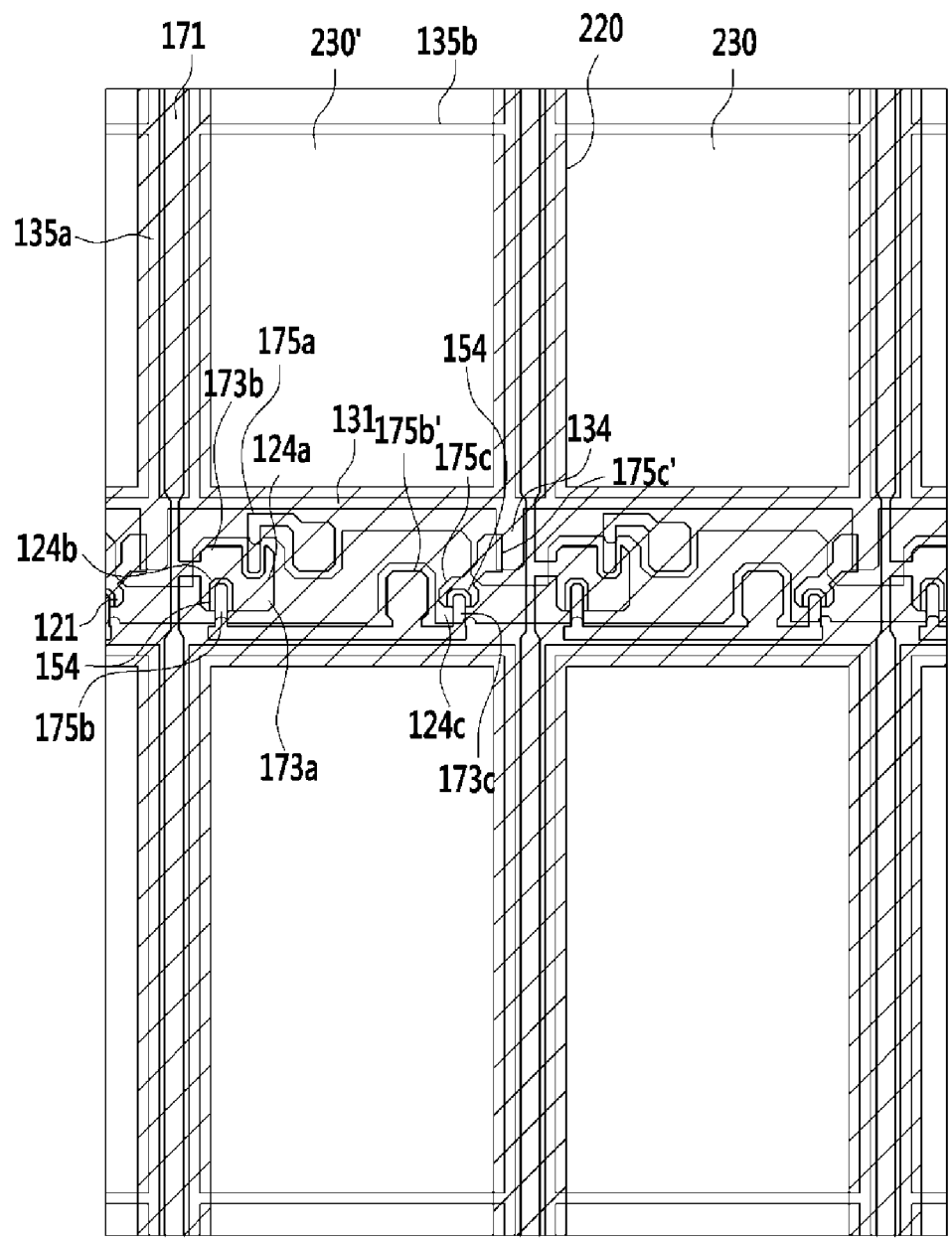
FIG. 7A is a plan view of the display device of FIG. 1 at another stage of manufacture, according to exemplary embodiments.

FIGS. 7A and 7B illustrate the display device of FIG. 1 at a fourth stage of the manufacturing process, according to exemplary embodiments. It is noted that FIG. 7B is a cross-sectional view of the plan view illustrated in FIG. 7A taken along sectional line II-II illustrated in the plan view of FIG. 1

As seen in FIGS. 7A and 7B, a color filter 230 and a light blocking member 220 are formed on the first passivation layer 180. Accordingly, it is noted that FIG. 7A provides a layout view, whereas FIG. 7B provides a cross-sectional view, showing the color filter 230 and the light blocking member 220 after one or more processing steps, e.g., after one or more exposure and etching steps.

When forming the color filter 230 and the light blocking member 220, the color filter 230 may be formed before the light blocking member 220. The color filters 230 of the same color may be formed in adjacent pixels that are adjacent in a vertical direction (e.g., a direction parallel to data line 171). As previously described, the color filters 230 and 230' including different colors may be formed in adjacent pixels that are adjacent in a horizontal direction (e.g., a direction parallel to gate line 121). In this manner, exposing, developing, and etching processes may be performed for each color filter 230. A display device including three primary colors may form the color filter 230, and thereby, may be formed via three exposing, developing, and etching processes. In this manner, the color filter 230', which is formed on the data line 171 and positioned at a lower portion, may be formed before the color filter 230, which is formed at an upper portion. As such, the color filter 230' and the color filter 230 may be overlapped with each other.

According to exemplary embodiments, the color filter 230 may be removed in those positions (or regions) where the first, second, and third contact holes 186a, 186b, and 186c are to be formed during an etching process of the color filter 230.

Further, the light blocking member 220 is formed on the color filter 230. As previously noted, the light blocking member 220 may include any suitable non-transmissive material. Referring to an oblique portion (illustrating the light blocking member 220) of FIG. 7A, the light blocking member 220 is formed in a lattice structure including an opening corresponding to a region where an image is displayed. As such, the color filter (e.g., color filter 230) is formed at least in the opening.

According to exemplary embodiments, the light blocking member 220 includes a portion formed in a horizontal direction, e.g., a portion formed in a transistor formation region associated with the gate line 121, the storage voltage line 131, and the various thin film transistors, as well as includes a portion formed in a vertical direction, e.g., a portion formed in a region associated with the data line 171, each of which is illustrated in FIG. 7A.

Figure 8A:
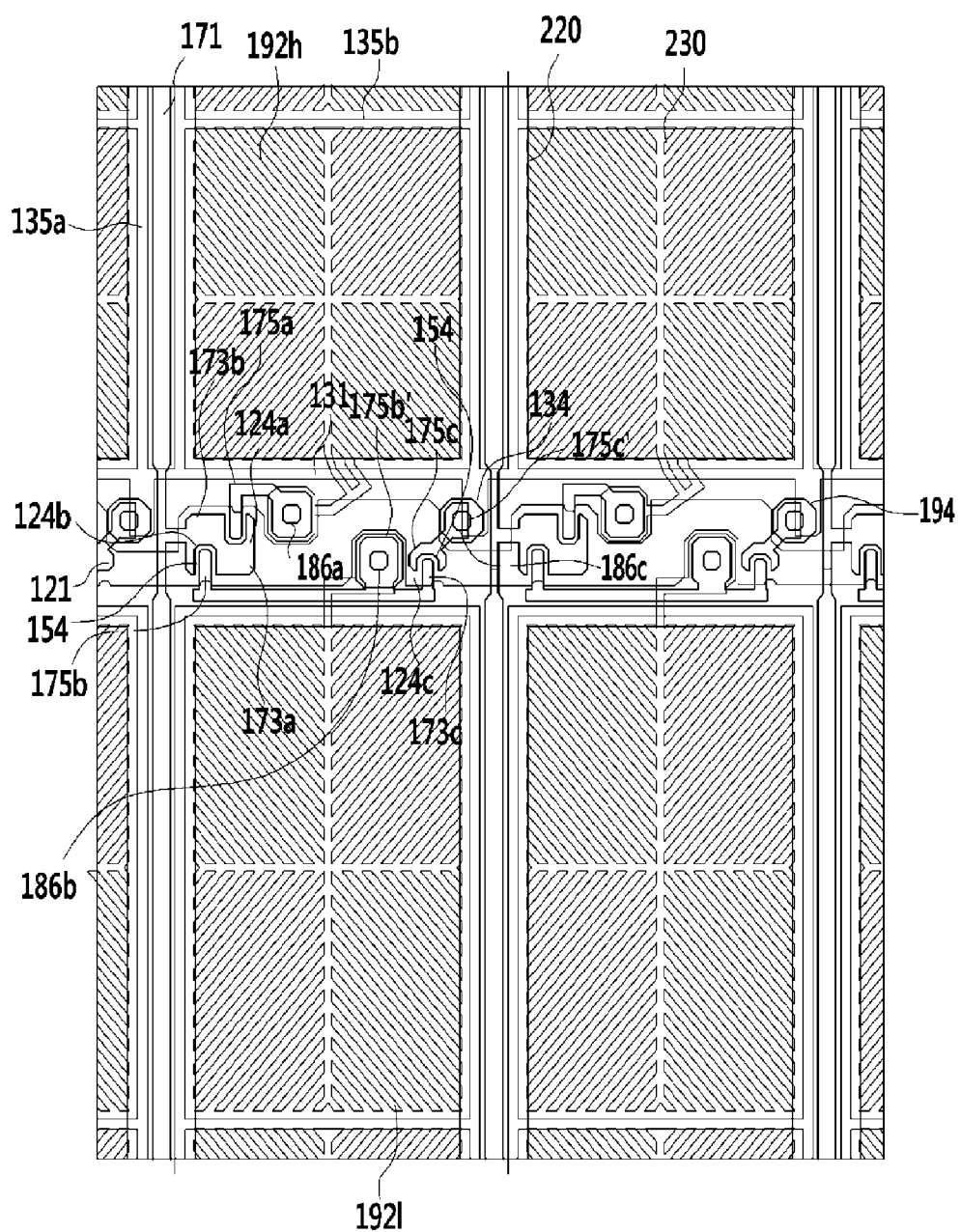
FIG. 8A is a plan view of the display device of FIG. 1 at another stage of manufacture, according to exemplary embodiments.
Figure 8B:
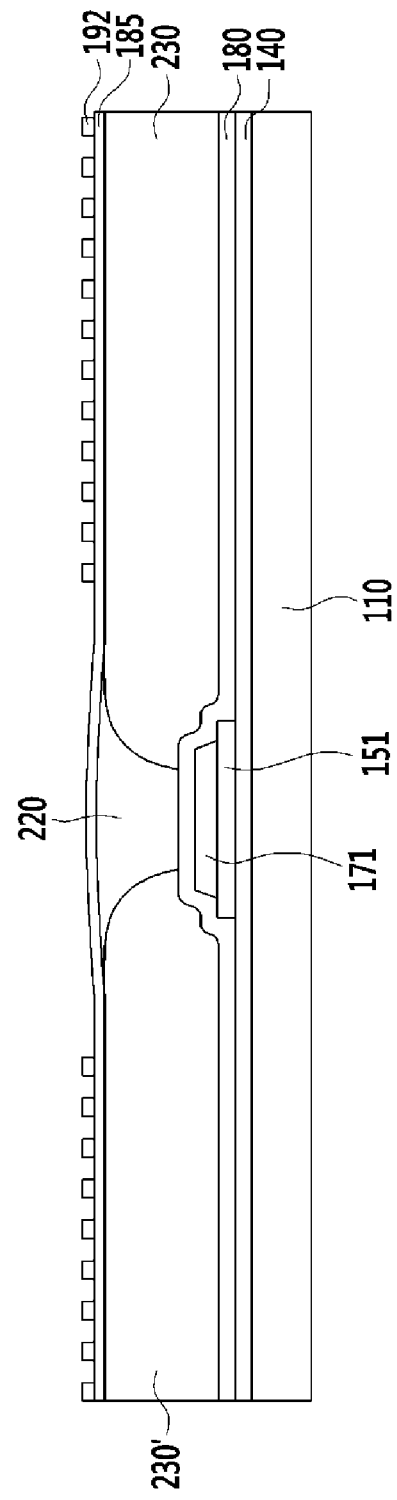
FIG. 8B is a cross-sectional view of the display device of FIG. 8A, according to exemplary embodiments.

FIGS. 8A and 8B illustrate the display device of FIG. 1 at a fifth stage of the manufacturing process, according to exemplary embodiments. It is noted that FIG. 8B is a cross-sectional view of the plan view illustrated in FIG. 8A taken along sectional line II-II illustrated in the plan view of FIG. 1.

Referring to FIGS. 8A and 8B, the second passivation layer 185 is formed on the color filter 230 and the light blocking member 220. As previously mentioned, the second passivation layer 185 may include any suitable material, such as, for example, an inorganic insulator, e.g., SiNx, SiOx, etc., or an organic insulator.

As such, the first contact hole 186a and the second contact hole 186b exposing the first drain electrode 175a and the extension 175b' of the second drain electrode 175b, respectively, are formed in the color filter 230, the light blocking member 220, and the passivation layers 180 and 185. Further, in the color filter 230, the light blocking member 220, and the passivation layers 180 and 185, the third contact hole 186c may be formed to expose the protrusion 134 of the storage voltage line 131 and the extension 175c' of the third drain electrode 175c.

According to exemplary embodiments, the pixel electrode 192 may be formed including the first subpixel electrode 192h and the second subpixel electrode 192l on the second passivation layer 185. In this manner, the pixel electrode 192 may be made of any suitable transparent conductive material, such as, for instance, AZO, GZO, ITO, IZO, etc. Further, it is noted that the first subpixel electrode 192h and the second subpixel electrode 192l are physically and electrically connected with the first drain electrode 175a and the second drain electrode 175b through the first and second contact holes 186a and 186b, respectively. Further, the connecting member 194 that electrically connects the extension 175c' of the third drain electrode 175c and the protrusion 134 of the storage voltage line 131 through the third contact hole 186c may be formed. As such, a part of the data voltage applied to the second drain electrode 175b may be divided through the third source electrode 173c. In this manner, the magnitude of the voltage applied to the second subpixel electrode 192l may be smaller than the magnitude of the voltage applied to the first subpixel electrode 192h.

Figure 9A:
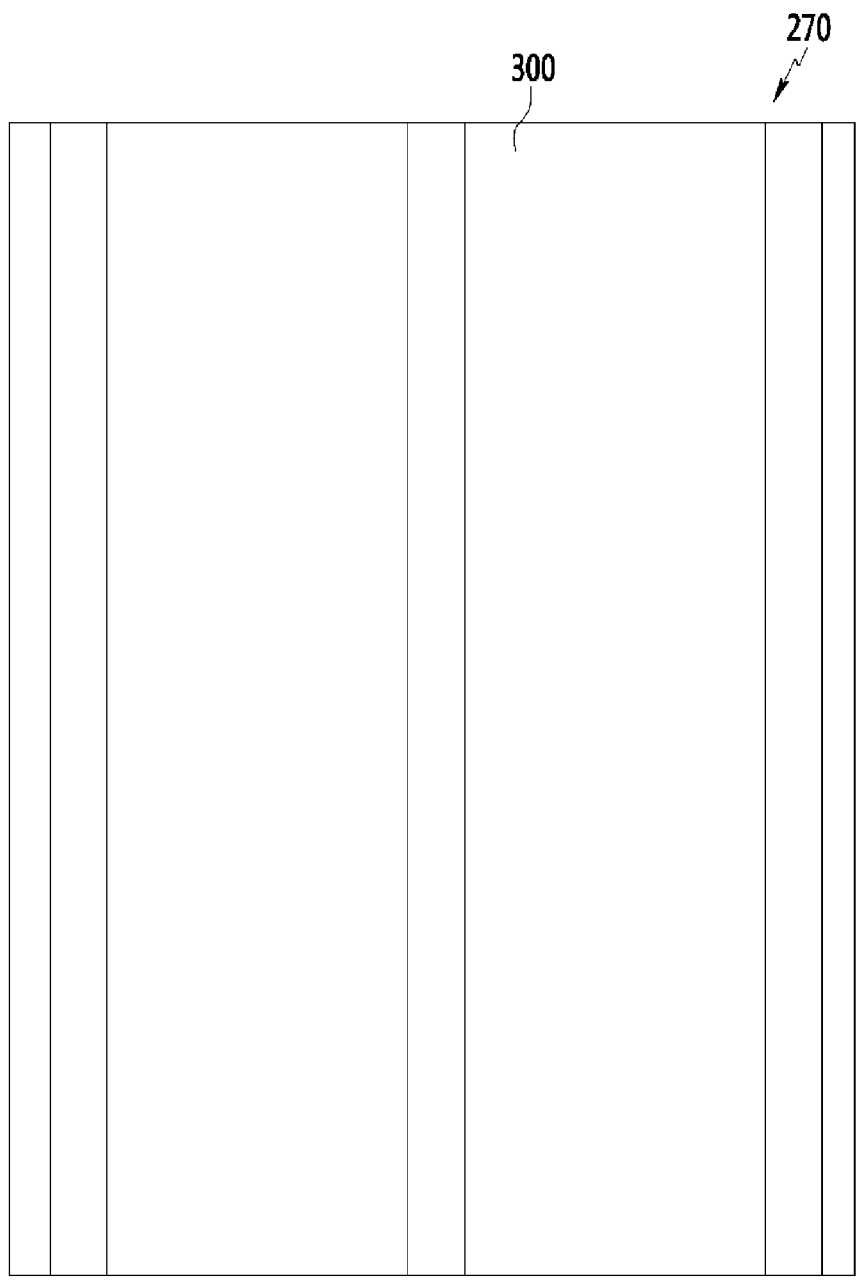
FIGS. 9A-9D illustrate the display device of FIG. 1 at another stage of the manufacturing process, according to exemplary embodiments.
Figure 9B:
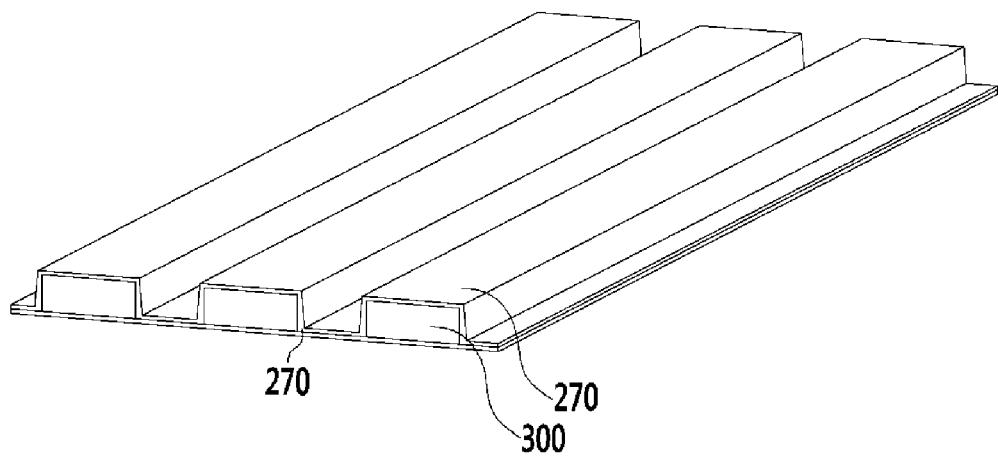
Figure 9C:
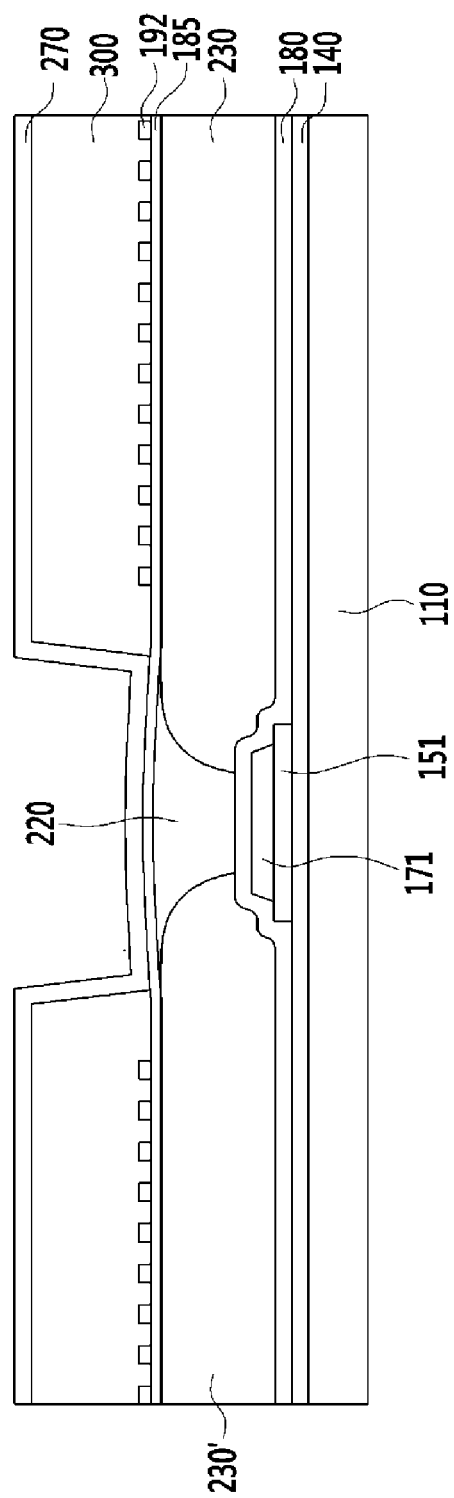
Figure 9D:
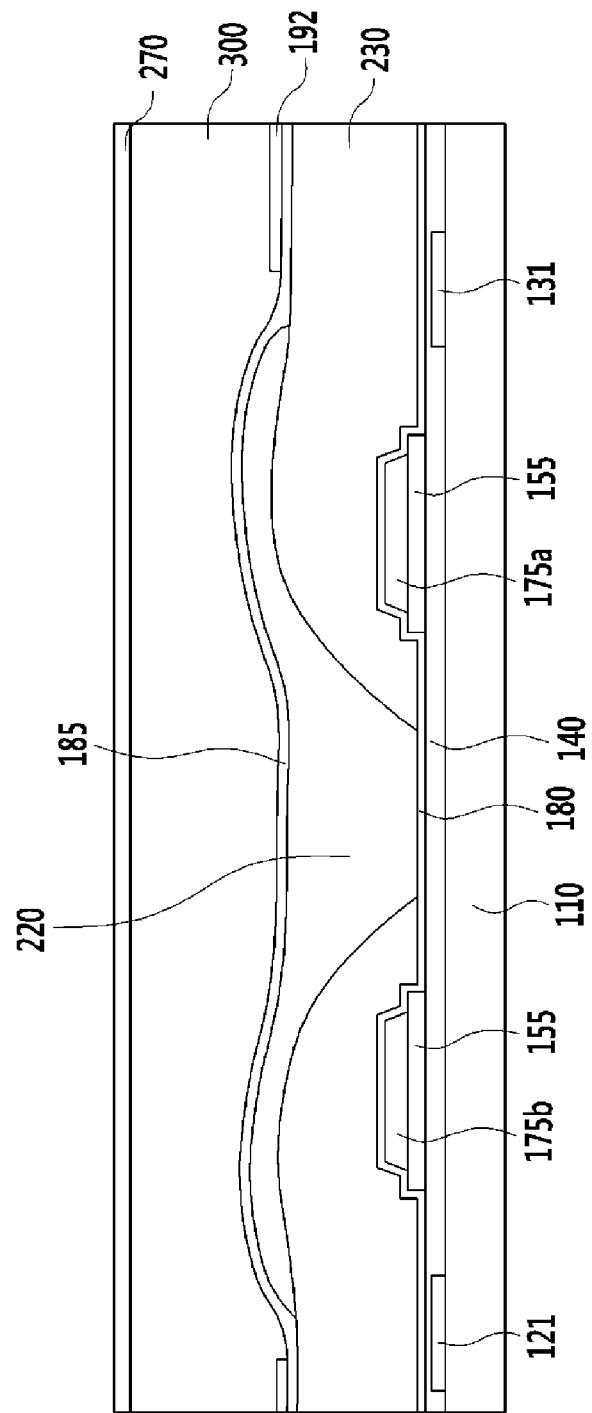

FIGS. 9A-9D illustrate the display device of FIG. 1 at a sixth stage of the manufacturing process, according to exemplary embodiments. It is noted that FIGS. 9C and 9D are cross-sectional views of the plan view illustrated in FIG. 9A taken along sectional lines II-II and III-III, which are respectively illustrated in the plan view of FIG. 1. Further, FIG. 9B is a perspective view of a portion of the display device of FIG. 1, according to exemplary embodiments.

As seen in FIGS. 9A-9D, a sacrificial layer 300 may be formed, upon which the common electrode 270 is sequentially formed. The sacrificial layer 300 and the common electrode 270 may be formed by, for example, the following illustrative process.

The formation process of the sacrificial layer 300 is described first. Amorphous carbon, metal, or an inorganic material is deposited on all or a portion of the then existing surface of the display device including the second passivation layer 185 and the pixel electrode 192. The deposited material corresponding to the sacrificial layer is etched to form the structure of the sacrificial layer 300. Since the material for the sacrificial layer 300 may be at least one of the amorphous carbon, the metal, or the inorganic material, it is noted that different etch methods or etchants may be used based on the material utilized to form the sacrificial layer 300. As shown in FIG. 9A, the sacrificial layer 300 longitudinally extends parallel (or substantially parallel) to the longitudinally extending direction of the data line 171. In this manner, the sacrificial layer 300 may be elongated according to adjacent pixels that are vertically adjacent to each other.

According to exemplary embodiments, the sacrificial layer 300 is formed so that it is not formed on the data line 171, such as seen in FIG. 9C.

As previously described, the sacrificial layer 300 is not formed of an organic material, such as a photoresist (PR) material, and as such, a side surface of the sacrificial material disposed near the data line 171 may be angled at 90±10 degrees, which is (or is substantially) a vertical structure.

According to exemplary embodiments, the sacrificial layer 300 is covered with a transparent conductive material, e.g., AZO, GZO, ITO, IZO, etc., which is deposited to form a common electrode 270. In this manner, the common electrode 270 is positioned on the upper surface and the side surface of the sacrificial layer 300. Further, the common electrode 270 longitudinally extends along the upper surface and the side surface of the sacrificial layer 300. In other words, the longitudinally extending direction of the common electrode 270 may be parallel (or substantially parallel) to the longitudinal direction in which the gate line 121 extends.

Figure 10A:
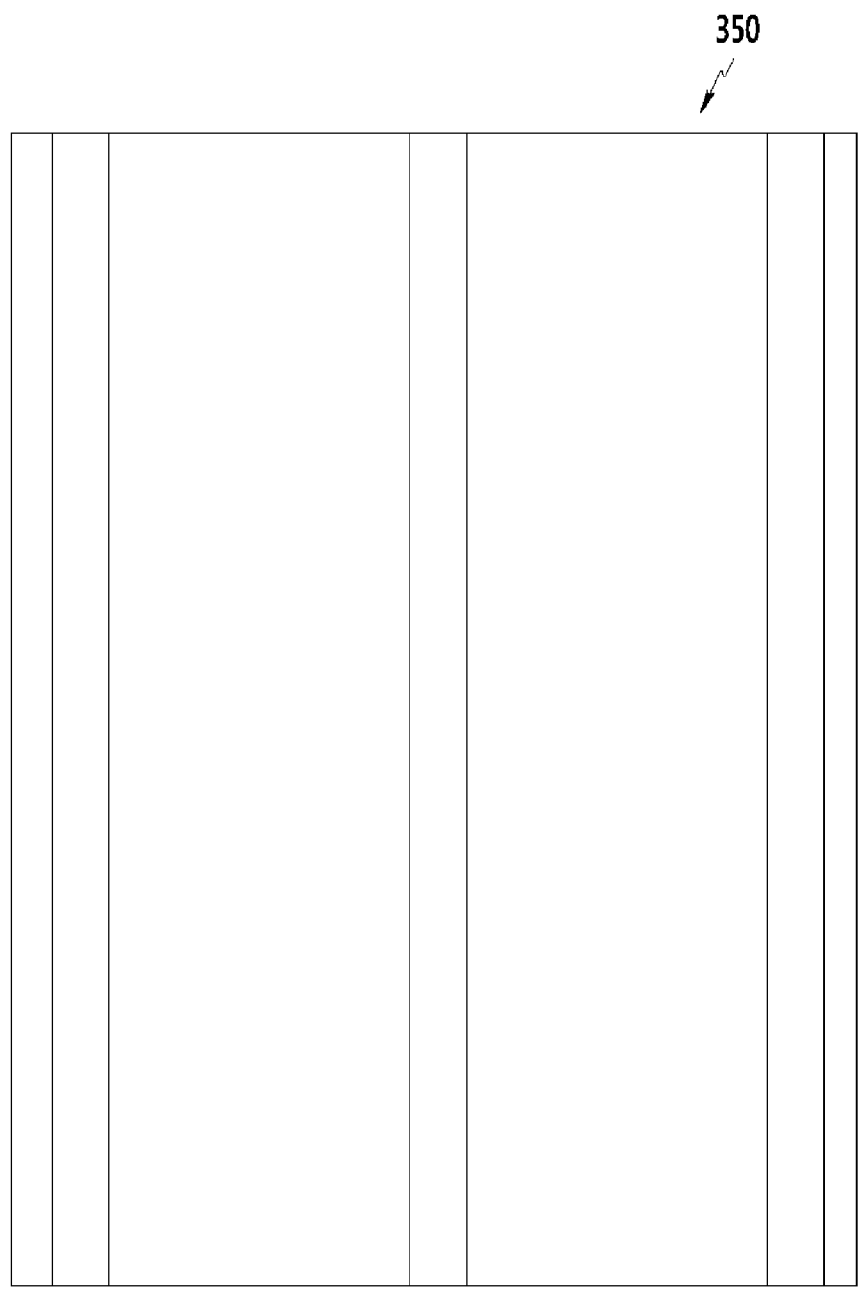
Figure 10B:
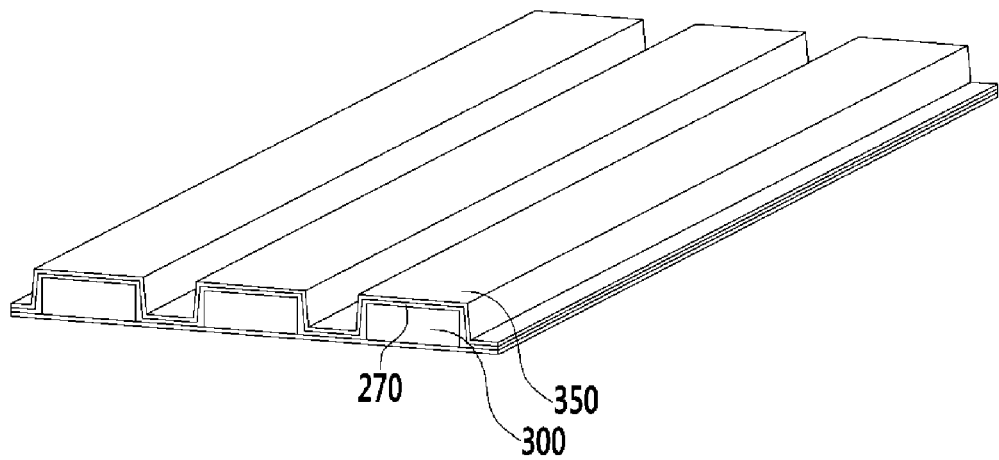
Figure 10D:
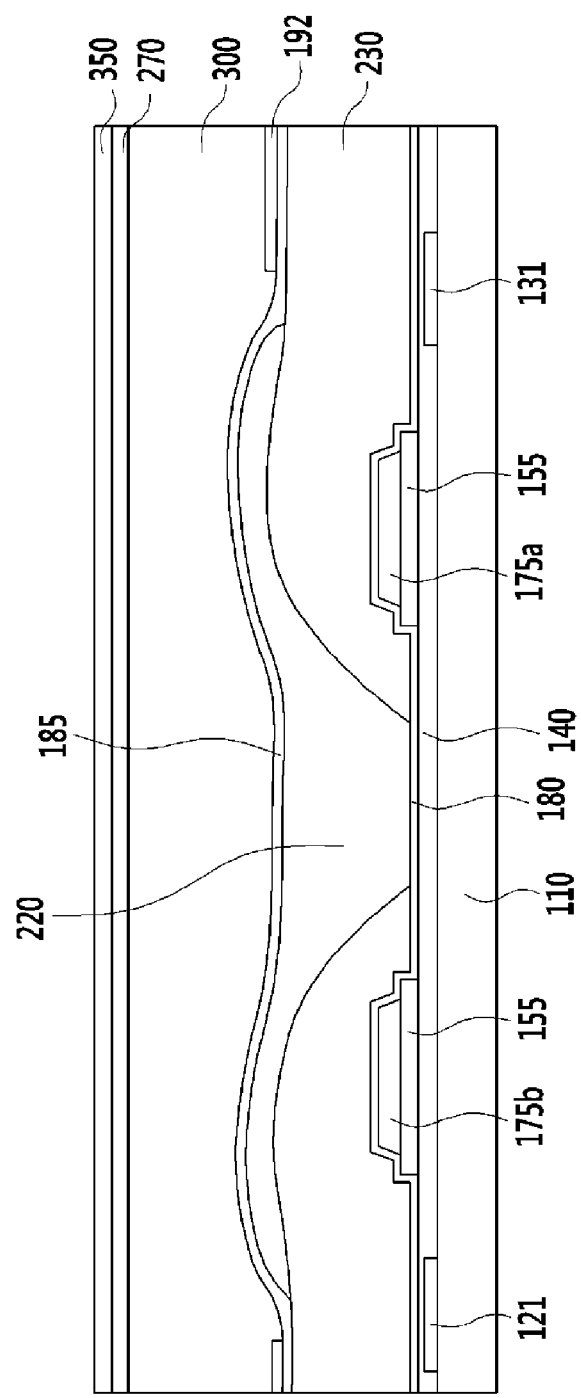

FIGS. 10A-10D illustrate the display device of FIG. 1 at a seventh stage of the manufacturing process, according to exemplary embodiments. It is noted that FIGS. 10C and 10D are cross-sectional views of the plan view illustrated in FIG. 10A taken along sectional lines II-II and III-III, which are respectively illustrated in the plan view of FIG. 1. Further, FIG. 10B is a perspective view of a portion of the display device of FIG. 1, according to exemplary embodiments.

As shown in FIGS. 10A-10D, a lower insulating layer 350 including, for instance, an inorganic insulating material, such as SiNx, SiOx, etc., is formed on the common electrode 270 to cover the common electrode 270.

Figure 11A:
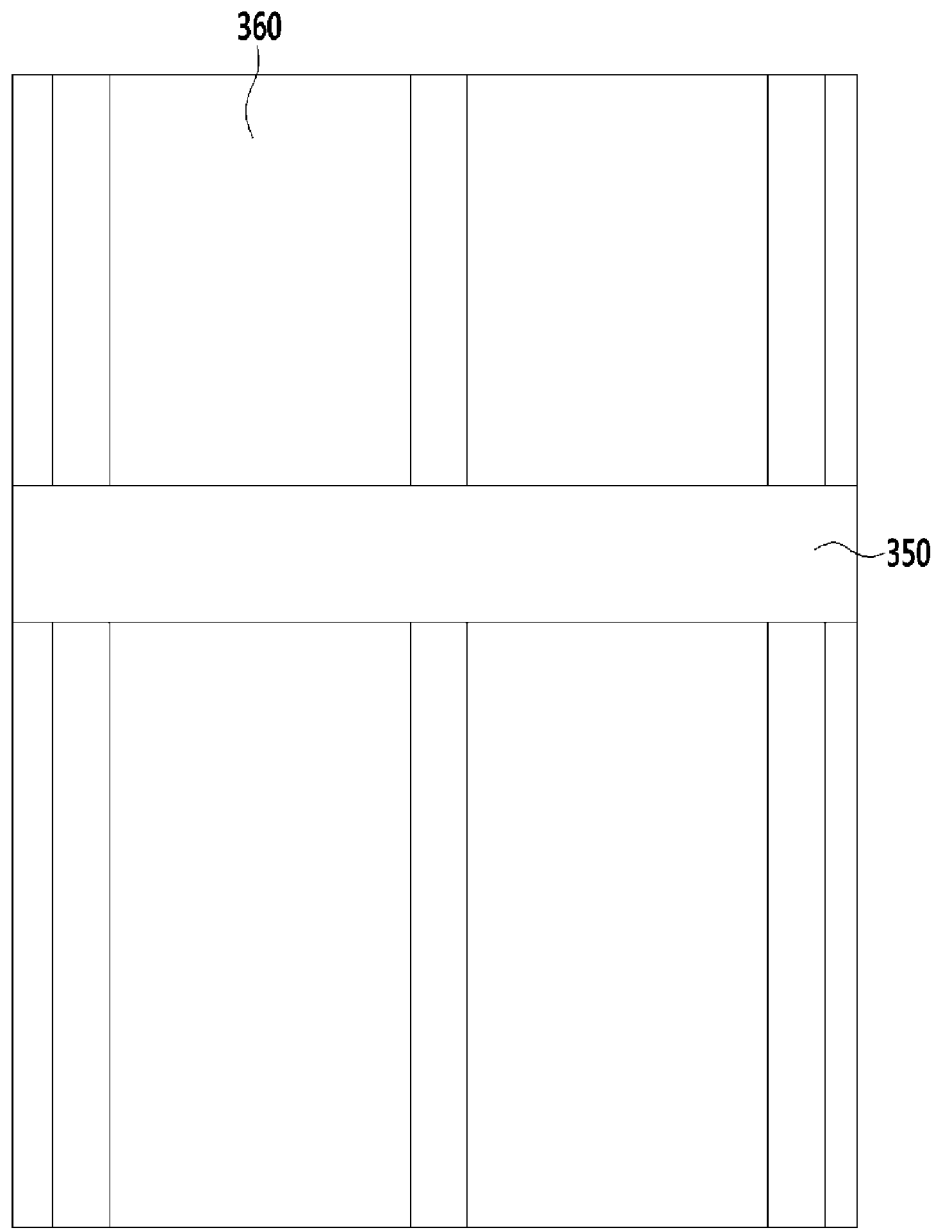
FIGS. 11A-11D illustrate the display device of FIG. 1 at another stage of the manufacturing process, according to exemplary embodiments.
Figure 11B:
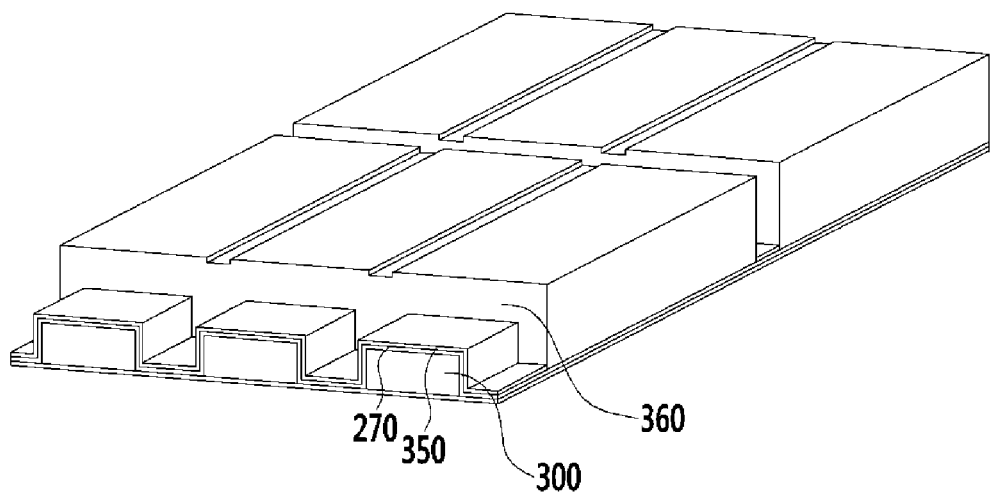
Figure 11C:
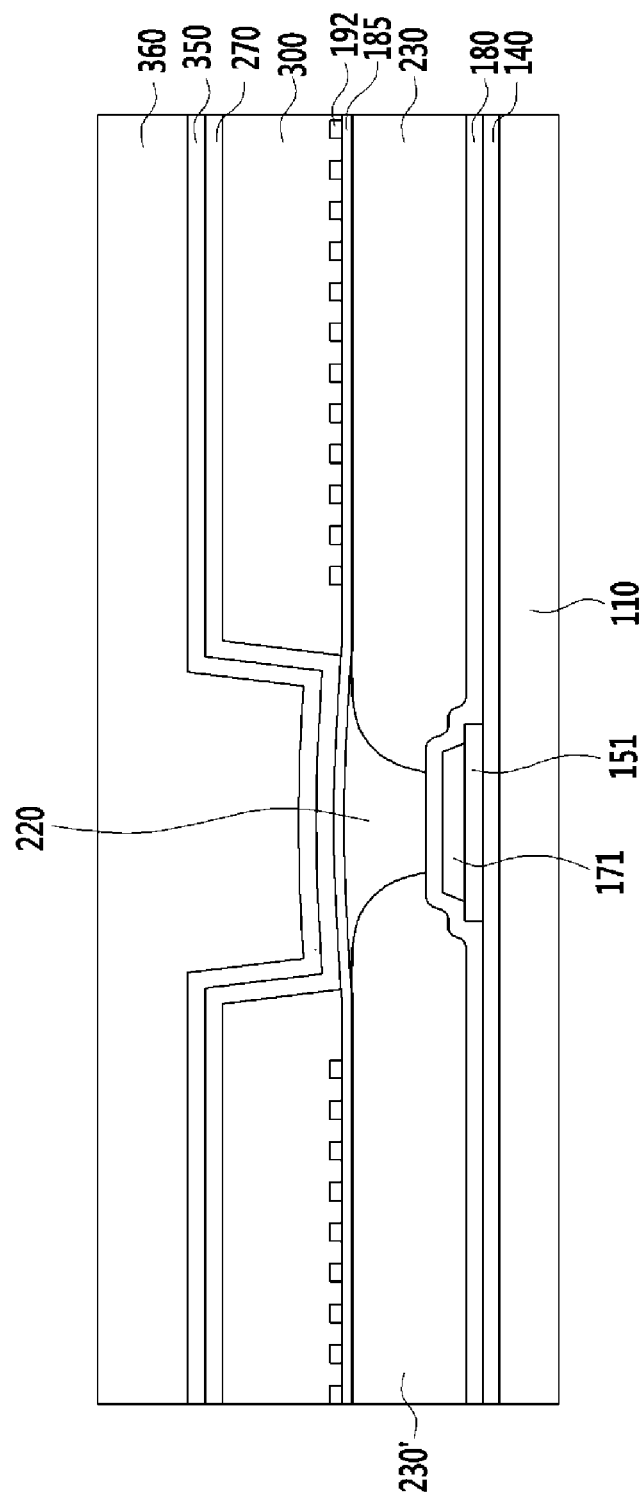
Figure 11D:
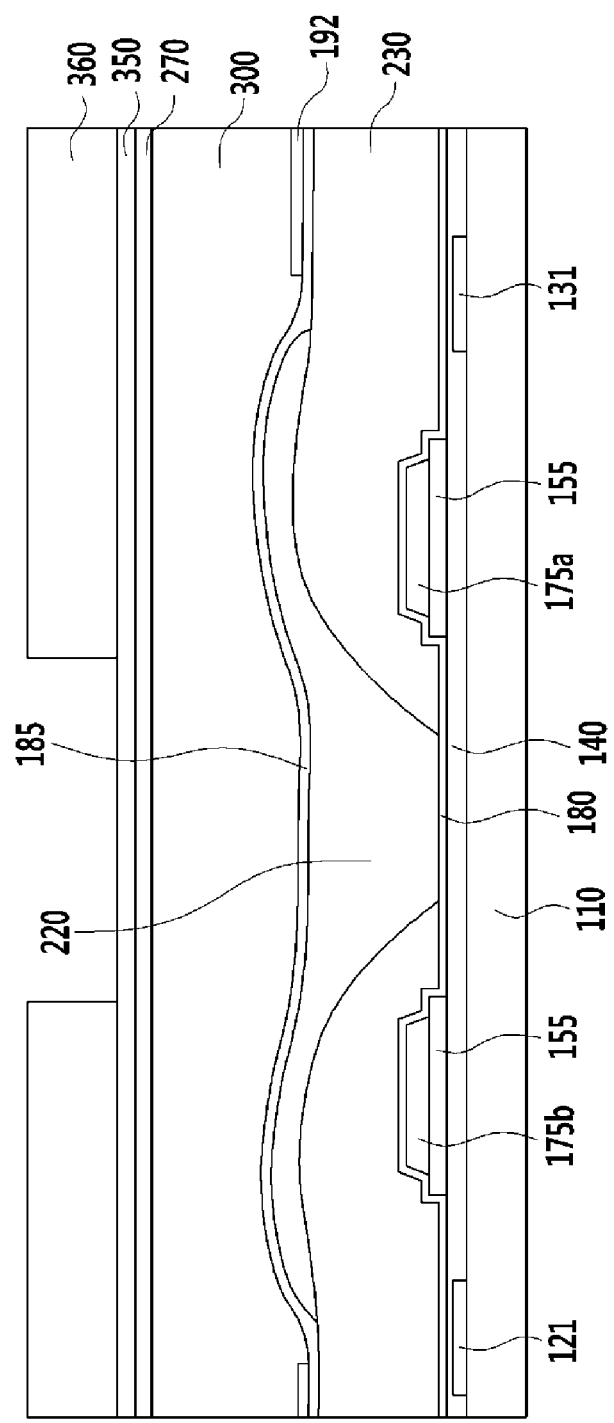

FIGS. 11A-11D illustrate the display device of FIG. 1 at an eighth stage of the manufacturing process, according to exemplary embodiments. It is noted that FIGS. 11C and 11D are cross-sectional views of the plan view illustrated in FIG. 11A taken along sectional lines II-II and III-III, which are respectively illustrated in the plan view of FIG. 1. Further, FIG. 11B is a perspective view of a portion of the display device of FIG. 1, according to exemplary embodiments.

Referring to FIGS. 11A-11D, the roof layer 360 is formed on at least a portion of the lower insulating layer 350. As previously noted, the roof layer 360 may contain any suitable material, such as an organic material. Further, the roof layer 360 is not formed in a region at which injection hole 307 is to be formed, which may also be referred to as a "injection hole open region." As seen in FIG. 11A, the injection hole open region is formed to correspond to the aforementioned thin film transistor formation region, and thereby, is formed including a structure longitudinally extending parallel (or substantially parallel) to a longitudinal direction of the gate line 121. Further, since the roof layer 360 is not formed in the injection hole open region, which is illustrated in FIG. 11D, the lower insulating layer 350 is exposed in the injection hole open region.

According to exemplary embodiments, the roof layer 360 is formed by, for instance, depositing a material for forming the roof layer including an organic material on the entire surface of the lower insulating layer 350. In this manner, the deposited material may be exposed and developed using a mask. As such, the material disposed in association with the region corresponding to the injection hole open region may be removed, thereby forming the roof layer 360. It is noted that the lower insulating layer 350 formed below the roof layer 360 in the injection hole open region is not etched but exposed. Accordingly, in the injection hole open region, the common electrode 270 and the lower insulating layer 350 are formed on the sacrificial layer 300, such that in the other regions, the sacrificial layer 300, the common electrode 270, the lower insulating layer 350, and the roof layer 360 are formed.

Figure 12A:
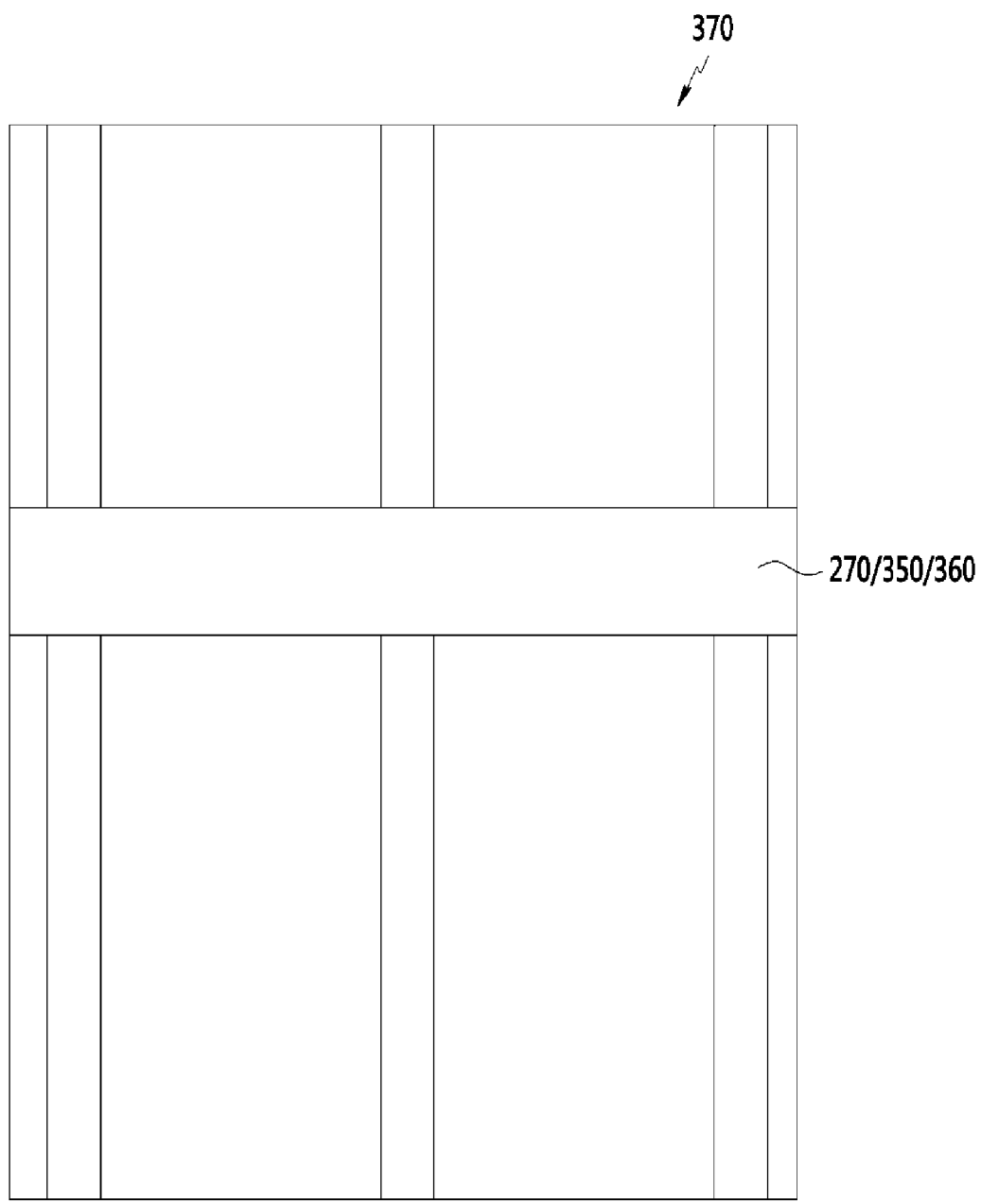
FIGS. 12A-12D illustrate the display device of FIG. 1 at another stage of the manufacturing process, according to exemplary embodiments.
Figure 12B:
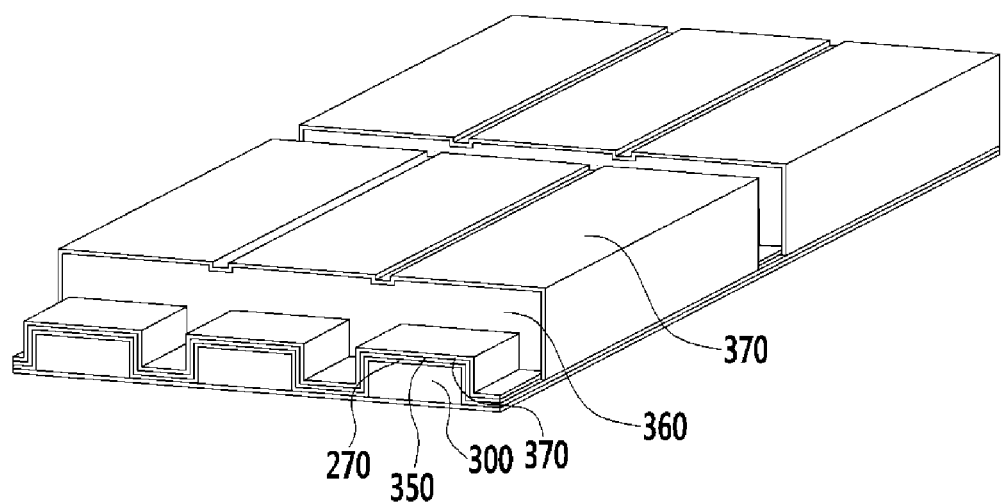
Figure 12C:
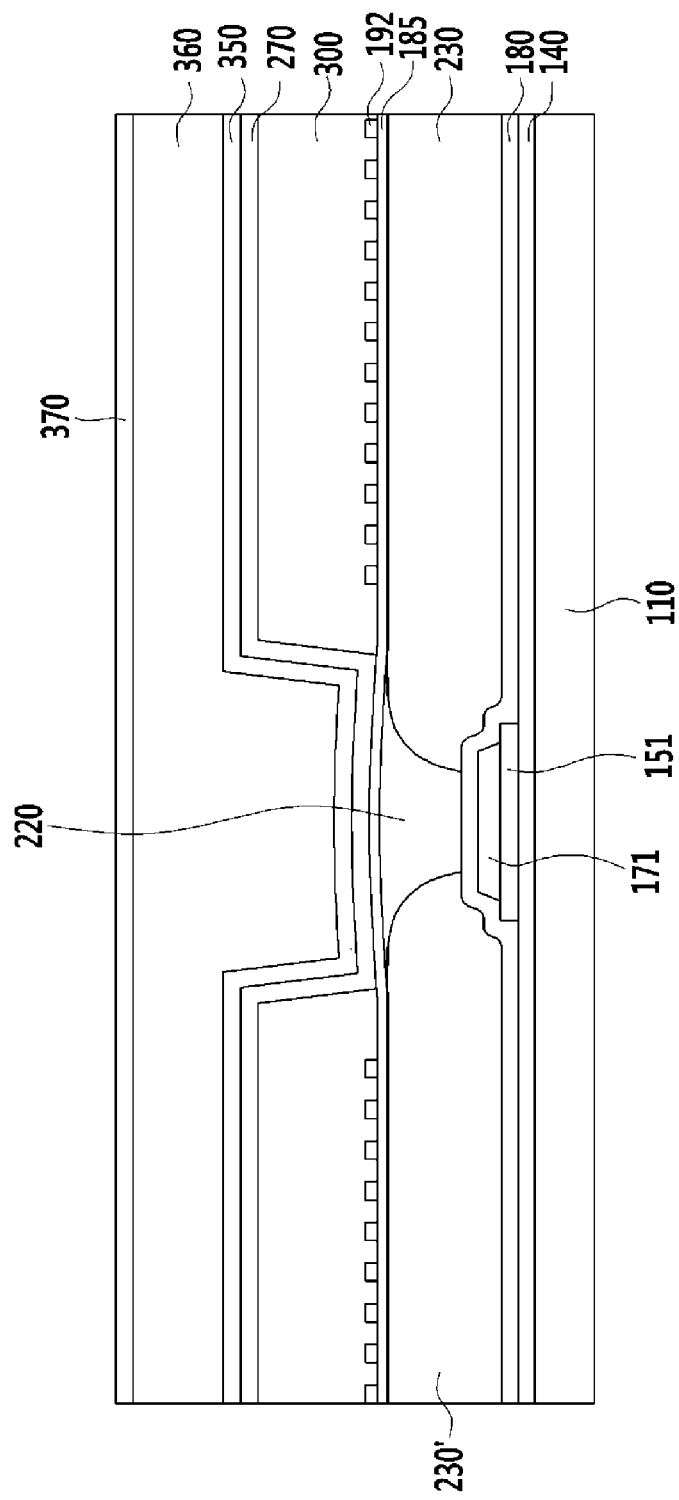
Figure 12D:
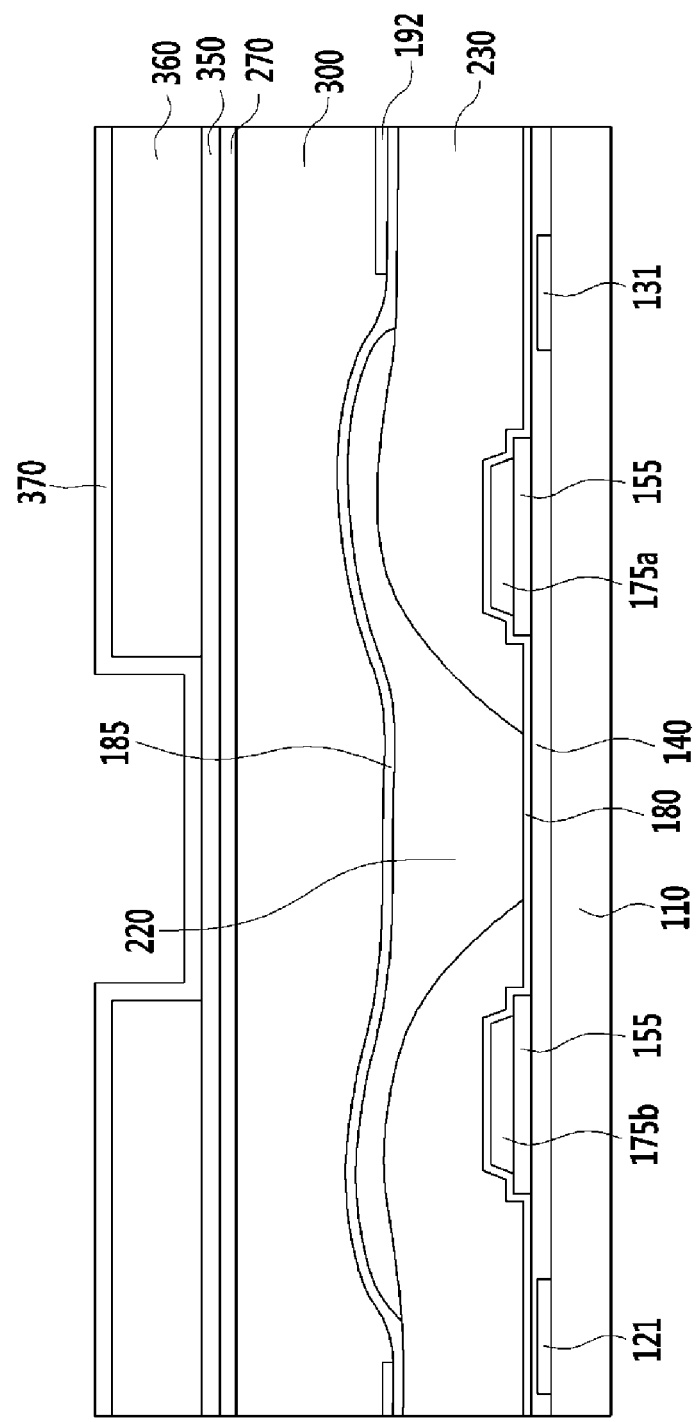

FIGS. 12A-12D illustrate the display device of FIG. 1 at a ninth stage of the manufacturing process, according to exemplary embodiments. It is noted that FIGS. 12C and 12D are cross-sectional views of the plan view illustrated in FIG. 12A taken along sectional lines II-II and III-III, which are respectively illustrated in the plan view of FIG. 1. Further, FIG. 12B is a perspective view of a portion of the display device of FIG. 1, according to exemplary embodiments.

As illustrated in FIGS. 12A-12D, a material for an upper insulating layer 370, which may include, for instance, an inorganic insulating material, such as SiNx, SiOx, etc., is deposited on all or at least a portion of the then existing surface of the display device.

FIGS. 13A-13E illustrate the display device of FIG. 1 at a tenth and eleventh stage of the manufacturing process, according to exemplary embodiments. It is noted that FIGS. 13D and 13E are cross-sectional views of the plan view illustrated in FIG. 13A taken along sectional lines II-II and III-III, which are respectively illustrated in the plan view of FIG. 1. It is noted that FIGS. 13A, 13D, and 13E correspond to the eleventh stage of the above-noted manufacturing process. Further, FIGS. 13B and 13C are perspective views of a portion of the display device of FIG. 1 respectively at the tenth and eleventh stages, according to exemplary embodiments.

As illustrated in FIGS. 13A and 13B, the injection hole 307 is formed by patterning (e.g., etching) one or more layers disposed in association with the injection hole open region.

More specifically, the lower insulating layer 350 and the upper insulating layer 370 are etched in the injection hole open region of the upper insulating layer 370 and the lower insulating layer 350. In this manner, the common electrode 270 remains disposed in the injection hole open region. As illustrated in FIG. 13B, the common electrode 270 formed in the injection hole open region is then etched to expose the sacrificial layer 300. According to exemplary embodiments, it is noted that the lower insulating layer 350, the upper insulating layer 370, and the common electrode 270 may be etched by the same etch process.

To etch the injection hole open region, a photoresist PR layer is formed, and the photoresist PR layer disposed in association with the injection hole open region is removed to form a photoresist pattern. In this manner, the injection hole 307 is etched according to the photoresist pattern. As such, in the injection hole open region, the materials associated with upper insulating layer 370, lower insulating layer 350, and the common electrode 270 are etched, such that a layer disposed below the sacrificial layer 300 is not etched. According to exemplary embodiments, a part of the sacrificial layer 300 may be etched or not etched in association with the etching of the upper insulating layer 370, lower insulating layer 350, and the common electrode 270. As previously noted, depending on the formation of the sacrificial layer 300, the process of etching the injection hole open region may be performed via dry etching or wet etching.

Referring to FIGS. 13B-13E, the exposed sacrificial layer 300 shown in FIG. 13B is removed as seen in FIGS. 13C-13E. In exemplary embodiments, the sacrificial layer 300 is not formed of an organic material, but of, for instance, amorphous carbon, metal, and/or an inorganic material, such that a wet etch or a dry etch may be utilized to remove the sacrificial layer 300 depending on the material utilized.

According to exemplary embodiments, the photoresist pattern layer formed to etch the injection hole open region may be removed using a separate photoresist stripper.

In this manner, and with reference to FIGS. 2 and 3, an alignment layer (not illustrated) and/or the liquid crystal molecules 310 are injected in the microcavity 305 by way of, for instance, a capillary force.

A capping layer 390 is formed to seal the injection hole 307, and thereby, to prevent liquid crystal molecules 310 from leaking outside the microcavity 305.

According to exemplary embodiments, the lower insulating layer 350 and the upper insulating layer 370 may be omitted.

While not illustrated, a process of attaching a respective polarizer (not illustrated) below the insulation substrate 110 and on the upper insulating layer 370 may also be performed. As previously noted, the polarizers may include any suitable polarization element for polarization and a TAC layer to facilitate durability. According to exemplary embodiments, directions of the transmissive axes of the polarizer disposed on the capping layer 390 and the polarizer disposed below the insulation substrate 110 may be perpendicular or parallel to each other.

According to exemplary embodiments, the sacrificial layer 300 is not formed of an organic material, but instead, includes at least one of the amorphous carbon, the metal, and the inorganic material. As such, a side surface of the microcavity 305 may be angled at 90±10 degrees with respect to the insulation substrate 110, and thereby, may form a (or substantially a) vertical surface. As previously mentioned, if liquid crystal molecules 310 are not sufficiently injected at the side surface of the microcavity 305 or the cell gap is relatively wide, light leakage may become an issue, such that a light blocking member 220 may be utilized to thwart such issues. However, according to exemplary embodiments, the side wall of microcavities 305 are sufficiently vertical with respect to the insulation substrate 110 (e.g., angled at 90±10 degrees), such that the horizontal area corresponding to the cell gap may be relative more narrow, and a wider opening area to inject liquid crystal molecules 310 may be obtained.

As described above, to form the side wall portions of the microcavity region 305 with an angle of 90±10 degrees, the sacrificial layer 300 is not made of an organic material, but various other materials may be utilized, such amorphous carbon, metal, and/or an inorganic material. Accordingly, formation of the sacrificial layer 300 using one or more of amorphous carbon, metal, and an inorganic material is described in more detail in association with FIGS. 14-16.

FIGS. 14A-14D illustrate a process of forming a sacrificial layer including amorphous carbon and removing the sacrificial layer to form a microcavity, according to exemplary embodiments.

Figure 14A:
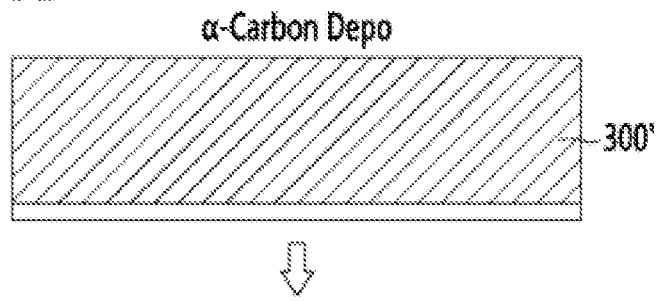
FIGS. 14A-14D illustrate a process of forming a sacrificial layer including amorphous carbon and removing the sacrificial layer to form a microcavity, according to exemplary embodiments.

As shown in FIG. 14A, after forming an underlying structure including the pixel electrode 192, a material 300' utilized to form the sacrificial layer (e.g., a material including amorphous carbon) is deposited at least on a portion of the underlying structure corresponding to where the microcavity 305 is to be formed.

Figure 14B:

Referring to FIG. 14B, the material 300' including amorphous carbon is etched to form a pattern corresponding to the sacrificial layer 300. When etching the material 300', a photoresist pattern is formed on the material 300', and the material 300' is dry-etched utilizing the photoresist pattern as a mask. In this manner, the sacrificial layer 300 including amorphous carbon is formed.

Figure 14C:
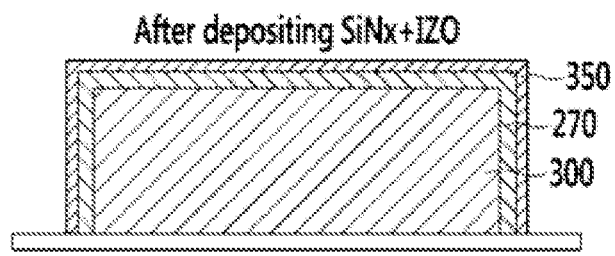

According to exemplary embodiments, a common electrode 270 is formed on the sacrificial layer 300, and then a lower insulating layer 350, a roof layer 360, and an upper insulating layer 370 are deposited on the common electrode 270. As seen in FIG. 14C, only the lower insulating layer 350 is shown and the other overlying layers are omitted.

Figure 14D:
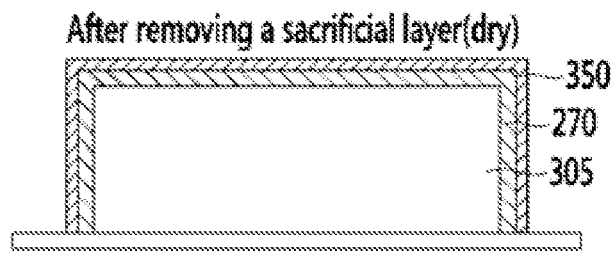

In exemplary embodiments, an injection hole 307 is formed to expose a portion of the sacrificial layer 300. As such, the sacrificial layer 300 is removed to form a microcavity 305, as seen in FIG. 14D. It is noted that the sacrificial layer 300 may be removed by dry etching the sacrificial layer 300.

It is noted that when an organic material is utilized to form the sacrificial layer, the organic material is typically formed utilizing a baking process, such that a characteristic of the other surrounding layers may be undesirably affected (or otherwise changed) due to, for example, heat associated with the baking process. It is also noted that, when applying a plasma deposition process, the sacrificial layer made of an organic material may not be entirely wet-etched, such that at least some of the sacrificial layer may remain.

According to exemplary embodiments, however, formation of the sacrificial layer 300 including amorphous carbon does not undesirably affect (or otherwise change) the characteristics of the other surrounding layers, and the sacrificial layer 300 may be entirely removed via the dry etch process, such that a side surface thereof may be sharply formed.

It is noted that the side surface of the sacrificial layer 300 including amorphous carbon may include a reverse taper structure, such as illustrated in FIG. 15.

FIG. 15 is a cross-sectional view of a display device, according to exemplary embodiments.

It is noted that the cross-sectional view of FIG. 15 is taken along sectional line II-II illustrated in FIG. 1; however, in FIG. 15 unlike FIG. 2, the side surface of the microcavity 305 includes a reverse taper structure, and an insulating layer 187 for preventing a short is additionally formed on the pixel electrode 192. The insulating layer 187 for preventing the short is an insulating layer configured to remove a problem of the common electrode 270 being short-circuited while contacting the pixel electrode 192 when the microcavity 305 is not supported. It is noted, however, that the insulating layer 187 for preventing the short may be omitted.

According to exemplary embodiments, the microcavity 305 including the side surface being reversely tapered may also be generated when the sacrificial layer is formed using an inorganic material or a metal, as well as when the sacrificial layer 300 includes amorphous carbon.

In exemplary embodiments, the sacrificial layer 300 may be formed from an inorganic material. It is noted that such a sacrificial layer 300 may be similarly formed as the sacrificial layer including amorphous carbon as described in association with FIG. 14.

FIGS. 16A-16D illustrate a process of forming a sacrificial layer including a metal and removing the sacrificial layer to form a microcavity, according to exemplary embodiments.

Figure 16A:
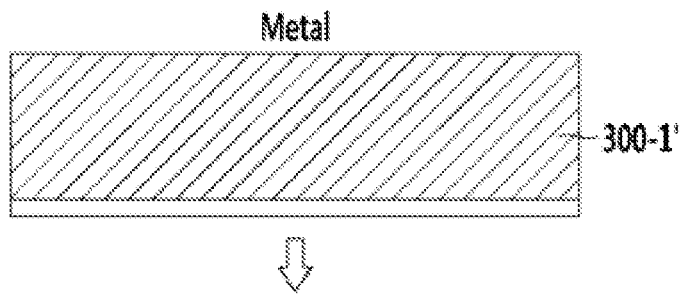
FIGS. 16A-16D illustrate a process of forming a sacrificial layer including metal and removing the sacrificial layer to form a microcavity, according to exemplary embodiments.

As seen in FIG. 16A, after forming an underlying structure including the pixel electrode 192, a material 300-1' is deposited at least on a portion of the underlying structure corresponding to where the microcavity 305 is to be formed. It is noted that the metal may be a single metal material or may be an alloy material.

Figure 16B:
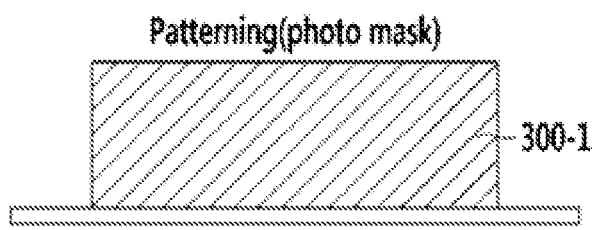

Referring to FIG. 16B, the material 300-1' is etched to form a pattern corresponding to the sacrificial layer 300-1. When etching the material 300-1', a photoresist pattern is formed on the material 300-1' and the material 300-1' is wet-etched or dry-etched utilizing the photoresist pattern as a mask. In this manner, the sacrificial layer 300-1 including the metal is formed.

Figure 16C:
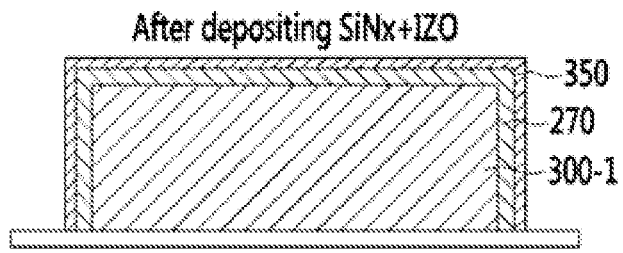

According to exemplary embodiments, a common electrode 270 is formed on the sacrificial layer 300-1, and then a lower insulating layer 350, a roof layer 360, and an upper insulating layer 370 are deposited on the common electrode 270. As seen in FIG. 16C, only the lower insulating layer 350 is shown, and the other overlying layers are omitted.

Figure 16D:
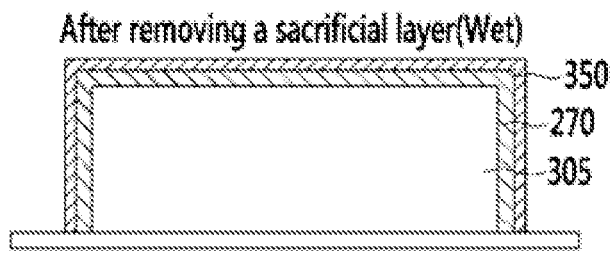

In exemplary embodiments, an injection hole 307 is formed to expose a portion of the sacrificial layer 300-1. As such, the sacrificial layer 300-1 is removed to form a microcavity 305, as seen in FIG. 16D. It is noted that the sacrificial layer 300-1 may be removed by wet etching the sacrificial layer 300-1.

As previously mentioned, when an organic material is utilized to form the sacrificial layer, the organic material is typically formed utilizing a baking process, such that a characteristic of the other surrounding layers may be undesirably affected (or otherwise changed) due to, for example, heat associated with the baking process. It is also noted that when applying a plasma deposition process, the sacrificial layer made of an organic material may not be entirely wet-etched, such that at least some of the sacrificial layer may remain.

According to exemplary embodiments, however, formation of the sacrificial layer 300-1 including metal does not undesirably affect (or otherwise change) the characteristics of the other surrounding layers, and the sacrificial layer 300-1 may be entirely removed via the wet etching process, such that a side surface thereof may be sharply formed.

It is noted that the side surface of the sacrificial layer 300-1 including the metal may include the reverse taper structure, such as illustrated in FIG. 15.

According to exemplary embodiments, the metal may be formed via a process at a temperature of more than 300 degrees. At this temperature, however, the characteristics of the other surrounding layers are not undesirably affected, but an electro-chemical reaction is possible, such that the sacrificial layer 300 may be removed via an etchant without limitation, which is different from removable of a sacrificial layer removed when formed including an organic material.

It is noted, however, that since the above-noted etchant may etch other surrounding layers, care should be exercised.

According to exemplary embodiments, the common electrode 270 or the pixel electrode 192 may include poly-crystalline ITO among other transparent conductive materials. Poly-crystalline ITO typically exhibits a large selectivity for a metal etchant, such that it is not etched together when removing the sacrificial layer 300 including the metal. Also, poly-crystalline ITO is typically etched using aqua regia (HNO3+HCl) due to a structural characteristic of the poly-crystalline ITO. In this manner, chemical resistance may be suddenly increased after annealing to increase crystallization.

Further, according to exemplary embodiments, the sacrificial layer 300-1 including the metal may be formed using an electroless plating process. Electroless plating typically enables fast layer formation, and the sacrificial layer 300-1 may be formed of a metal, such as copper (Cu), nickel (Ni), aluminum (Al), chromium (Cr), etc.

Moreover, according to exemplary embodiments, the common electrode 270 or the pixel electrode 192 may include amorphous ITO or amorphous IZO, and galvanic corrosion may result when the metal (or the etchant utilized to remove the metal) is used as the sacrificial layer 300-1. As such, it is noted that care should be exercise to determine materials of the sacrificial layer, the pixel electrode, and the common electrode to prevent galvanic corrosion, which is described in more detail in association with FIGS. 17-20.

FIGS. 17-20 respectively illustrate relations between a transparent electrode and a metal sacrificial layer, according to exemplary embodiments.

The table of FIG. 17 provides corrosion existence with reference to a standard electrode potential of a metal material utilized to form the sacrificial layer 300-1 and a metal for a transparent electrode (e.g., a common electrode 270 or a pixel electrode 192). As seen in FIG. 17, a horizontal direction is associated with the metal material for the sacrificial layer 300-1 and the vertical direction is associated with the material for the transparent electrode.

In the table of FIG. 17, the metal material for the sacrificial layer 300-1 is nickel (Ni), molybdenum (Mo), aluminum (Al), copper (Cu), or chromium (Cr), and the material for the transparent electrode is indium (In), zinc (Zn), or tin (Sn) used in, for example, ITO, IZO, etc.

The table of FIG. 17 includes the standard electrode potentials of each metal. A metal including the lower standard electrode potential among the two metals of the metal utilize to form the sacrificial layer and the material utilized to form the transparent electrode functions as an anode and may be corroded. In this manner, the corrosion may be accelerated according to the difference in the standard electrode potentials.

As shown in FIG. 17, nickel, molybdenum, and aluminum may corrode the amorphous ITO or the amorphous IZO that is contacted when etching. Therefore, in FIG. 17, it may be confirmed that chromium and copper better materials from which to form the sacrificial layer, and the usage of nickel, molybdenum, and aluminum is limited.

In the table of FIG. 17, a portion where the material utilized to form the sacrificial layer and the material utilized to form the transparent electrode cross describes the material (the anode) including the lower standard electrode potential. When a material acting as the anode is the material utilized to form the sacrificial layer, only the material utilized to form the sacrificial layer may be etched and the material for the transparent electrode remains, such that exemplary embodiments may be realized without concern. However, when a material functioning as the anode is the material utilized to form the transparent electrode, the material utilized to form the transparent electrode is also corroded in removing the material utilized to form the sacrificial layer, such that it is not as easy to realize exemplary embodiments disclosed herein.

According to exemplary embodiments, the material utilized to form the transparent electrode does not generally include one metal material, but includes a plurality of materials as an alloy type, such that the standard electrode potentials of all materials included in the material utilized to form the transparent electrode are lower than the standard electrode potential of the material utilized to form the sacrificial layer.

Figure 19:
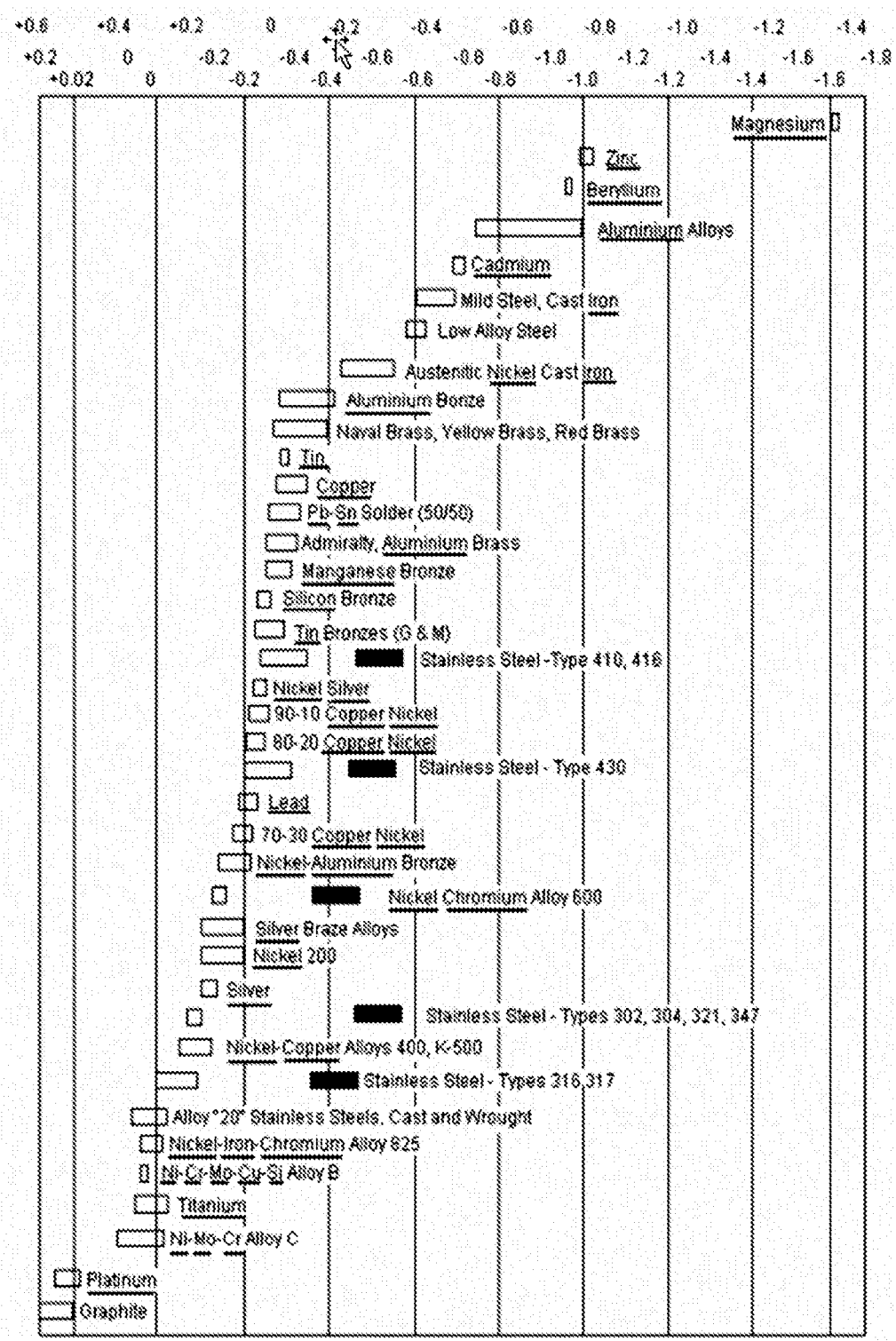

FIG. 18 is a table showing a standard electrode level, and FIG. 19 is a galvanic series showing a degree of galvanic corrosion (e.g., heterogeneous metal corrosion).

FIG. 20 is a table to determine the potential of heterogeneous metal corrosion (e.g., galvanic corrosion) not forming after disposing the same metals in a transverse direction and a longitudinal direction. As seen in FIG. 20, those conditions indicated by an "X" may be used without considering heterogeneous metal corrosion.

While exemplary embodiments have been described, such that the pixel electrode 192 is positioned under the liquid crystal layer 3 or in the microcavity 305 and the common electrode 270 is positioned on each of the liquid crystal layer 3 and the microcavity 305, it is also contemplated that the common electrode 270 may be positioned under the liquid crystal layer 3 or in the microcavity 305.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, comprising:
    forming, on a substrate of a display device, a sacrificial layer comprising a material, the material comprising at least one of amorphous carbon, a metal, and an inorganic material;
    forming an electrode covering the sacrificial layer;
    forming a lower insulating layer covering the electrode;
    forming, after forming the lower insulating layer, a layer covering the sacrificial layer;
    forming an injection hole exposing the sacrificial layer;
    removing, via the injection hole, the sacrificial layer to form a microcavity;
    disposing liquid crystal in the microcavity; and
    forming, after forming the layer covering the sacrificial layer, an upper insulating layer covering both the layer covering the sacrificial layer and an exposed portion of the lower insulating layer formed in the region associated with the injection hole,
    wherein the layer covering the sacrificial layer is disposed outside a region associated with the injection hole.

2. The method of claim 1, wherein, when the sacrificial layer is the amorphous carbon or the inorganic material, removing the sacrificial layer comprises:
    dry etching the sacrificial layer.

3. The method of claim 1, wherein, when the sacrificial layer is the metal, removing the sacrificial layer comprises:
    wet etching the sacrificial layer.

4. The method of claim 3, further comprising:
    forming another electrode, the electrode or the another electrode comprising a transparent conductive material,
    wherein the another electrode is disposed between the sacrificial layer and the substrate.

5. The method of claim 4, wherein, when the sacrificial layer comprises the metal, forming the electrode or the another electrode comprises:
    forming the electrode or the another electrode less thick than the sacrificial layer.

6. The method of claim 5, wherein the transparent conductive material comprises polycrystalline indium tin oxide (ITO).

7. The method of claim 5, wherein the metal comprises copper or chromium.

8. The method of claim 3, wherein forming the sacrificial layer comprises:
    depositing the metal on an underlying surface;
    forming, on the metal, a photoresist pattern; and
    patterning, using the photoresist pattern as a mask, the metal via at least one dry etching process or at least one wet etching process.

9. The method of claim 3, wherein the sacrificial layer is formed via at least one electroless plating process.

10. The method of claim 1, wherein a side surface of the microcavity comprises an angle of 80° to 100° with respect to the substrate.

11. The method of claim 1, wherein:
    the display device comprises at least one data line; and
    a longitudinal axis of the sacrificial layer extends substantially parallel to the at least one data line.

12. The method of claim 1, wherein forming the injection hole comprises:
    patterning the electrode, the lower insulating layer, and the upper insulating layer.

13. A method comprising:
    forming a sacrificial layer on a substrate of a display device;
    forming an electrode on the sacrificial layer;
    forming a layer on the electrode and covering the sacrificial layer;
    forming, through the electrode, an injection hole exposing the sacrificial layer, the layer being formed before the injection hole;
    removing, via the injection hole, the sacrificial layer to form a void; and
    disposing liquid crystal in the void.

* * * * *